United States Patent
Huang et al.

(10) Patent No.: US 12,017,414 B2
(45) Date of Patent: *Jun. 25, 2024

(54) THREE-DIMENSIONAL PRINTING OF HYDROPHOBIC MATERIALS IN FUMED SILICA SUSPENSION

(71) Applicant: UNIVERSITY OF FLORIDA RESEARCH FOUNDATION, INCORPORATED, Gainesville, FL (US)

(72) Inventors: Yong Huang, Gainesville, FL (US); Yifei Jin, Gainesville, FL (US); Nevada J. Gellermann, Gainesville, FL (US); Kaidong Song, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/870,424

(22) Filed: Jul. 21, 2022

(65) Prior Publication Data

US 2023/0226772 A1 Jul. 20, 2023

Related U.S. Application Data

(62) Division of application No. 16/707,087, filed on Dec. 9, 2019, now Pat. No. 11,426,945.

(Continued)

(51) Int. Cl.
*B29C 64/40* (2017.01)
*B29K 63/00* (2006.01)

(Continued)

(52) U.S. Cl.
CPC .............. *B29C 64/40* (2017.08); *B33Y 10/00* (2014.12); *B33Y 70/00* (2014.12); *B29K 2063/00* (2013.01); *B29K 2083/00* (2013.01)

(58) Field of Classification Search
CPC ......... B29C 64/40; B33Y 10/00; B33Y 70/00; B29K 2063/00; B29K 2083/00
See application file for complete search history.

(56) References Cited

U.S. PATENT DOCUMENTS

2010/0297213 A1  11/2010  Dupont et al.
2016/0067918 A1*  3/2016  Millar ................... B29C 64/106
                                                    425/375

(Continued)

FOREIGN PATENT DOCUMENTS

WO   WO-2015/017421 A2   2/2015

OTHER PUBLICATIONS

"Jin" ("Functional Nanoclay Suspension for Printing-Then-Solidification of Liquid Materials," Yifei Jin, Ashley Compaan, Wenxuan Chai, and Yong Huang, ACS Appl. Mater. Interfaces 2017, 9, 23, 20057-20066). (Year: 2017).*

(Continued)

*Primary Examiner* — Emmanuel S Luk
*Assistant Examiner* — Inja Song
(74) *Attorney, Agent, or Firm* — ALSTON & BIRD LLP

(57) ABSTRACT

A three-dimensional (3D) printing methodology is disclosed for freeform fabrication of hydrophobic structures without the use of printed support structures. The build material is directly printed in and supported by a fumed silica-containing yield-stress support bath to form an intermediate article in the support bath material. The intermediate article may be liquid or only partially solidified after being printed into the support bath material. The intermediate article is then heated or irradiated with ultraviolet radiation to initiate cross- (Continued)

linking to solidify the printed intermediate article, forming a finished article.

31 Claims, 29 Drawing Sheets

Related U.S. Application Data

(60) Provisional application No. 62/783,267, filed on Dec. 21, 2018.

(51) Int. Cl.
    *B29K 83/00*        (2006.01)
    *B33Y 10/00*        (2015.01)
    *B33Y 70/00*        (2020.01)

(56) References Cited

U.S. PATENT DOCUMENTS

| | | |
|---|---|---|
| 2016/0250808 A1 | 9/2016 | Barnwell, III et al. |
| 2018/0021140 A1 | 1/2018 | Angelini et al. |
| 2018/0281295 A1* | 10/2018 | Tibbits ............ B29C 64/106 |
| 2018/0282923 A1 | 10/2018 | Carlyle et al. |
| 2018/0370116 A1 | 12/2018 | Huang et al. |
| 2019/0092951 A1 | 3/2019 | Wang et al. |
| 2019/0375149 A1 | 12/2019 | Limem et al. |
| 2020/0198251 A1 | 6/2020 | Huang et al. |

OTHER PUBLICATIONS

"Grosskopf" (Abigail K. Grosskopf, Ryan L. Truby, Hyoungsoo Kim, Antonio Perazzo, Jennifer A. Lewis, and Howard A. Stone, "Viscoplastic Matrix Materials for Embedded 3D Printing," ACS Appl. Mater. Interfaces 2018, 10, 27, 23353-23361). (Year: 2018).*
U.S. Appl. No. 16/707,087, filed Dec. 9, 2019, 2020-0198251, Allowed.
Advisory Action for U.S. Appl. No. 16/707,087, dated Mar. 22, 2022, (4 pages), United States Patent and Trademark Office, USA.
Bhattacharjee, Tapomoy et al. *Writing In The Granular Gel Medium*. Science Advances, vol. 1, No. 8:e1500655, Sep. 25, 2015, pp. 1-6.
Final Office Action for U.S. Appl. No. 16/707,087, dated Dec. 29, 2021, (17 pages), United States Patent and Trademark Office, US.
Grosskopf, Abigail K. et al. *Viscoplastic Matrix Materials For Embedding 3D Printing*, ACS Applied Materials & Interfaces 2018, vol. 10, No. 27, pp. 23353-23361, Mar. 1, 2018, https://doi.org/10.1021/acsami.7b19818.
Hinton, Thomas J. et al. *3D Printing PDMS Elastomer In A Hydrophilic Support Bath Via Freeform Reversible Embedding*, ACS Biomaterials Science & Engineering, vol. 2, No. 10, (2016), pp. 1781-1786. DOI: 10.1021/acsbiomaterials.6b00170.
Hinton, Thomas J. et al. *Three-Dimensional Printing Of Complex Biological Structures By Freeform Reversible Embedding Of Suspended Hydrogels*. Science Advances, vol. 1, No. 9:e1500758, Oct. 23, 2015, (24 pages).
Jin, Yifei et al. *Functional Nanoclay Suspension For Printing-Then-Solidification Of Liquid Materials*, ACS Applied Materials & Interfaces, vol. 9, No. 23, (2017), pp. S1-S29. 20057-20066.
Jin, Yifei et al. *Granular Gel Support-Enabled Extrusion Of Three-Dimensional Alginate And Cellular Structures*, Biofabrication, vol. 8, No. 2: 025016, (2016), pp. 1-21.
Jin, Yifei et al. *Printability Study Of Hydrogel Solution Extrusion In Nanoclay Yield-Stress Bath During Printing-Then-Gelation Biofabrication*, Materials Science and Engineering: C, vol. 80, pp. 313-325, (2017), DOI: 10.1016/j.msec.2017.05.144.
NonFinal Office Action for U.S. Appl. No. 16/707,087, dated Aug. 3, 2021, (18 pages), United States Patent and Trademark Office, USA.
NonFinal Office Action for U.S. Appl. No. 16/781,336, dated Feb. 22, 2022, (18 pages), United States Patent and Trademark Office, US.
NonFinal Office Action for U.S. Appl. No. 16/781,336, dated Aug. 3, 2022, (12 pages), United States patent and Trademark Office, US.
Notice of Allowance and Fee(s) Due for U.S. Appl. No. 16/703,686, filed Jan. 28, 2021, (11 pages), United States Patent and Trademark Office, US.
Notice of Allowance and Fee(s) Due for U.S. Appl. No. 16/707,087, dated Apr. 25, 2022, (23 pages), United States Patent and Trademark Office, US.
O'Bryan, Christopher S. et al. (2017). *Three-Dimensional Printing With Sacrificial Materials For Soft Matter Manufacturing*. MRS Bulletin, vol. 42, No. 8, pp. 571-577. DOI: 10.1557/mrs.2017.167.
O'Bryan, Christopher S. et al. *Self-Assembled Micro-Organogels For 3D Printing Silicone Structures*, Science Advances, vol. 3, No. 5:e1602800, May 10, 2017, pp. 1-8.
Whitby, Catherine P. et al. "Understanding The Role of Hydrogen Bonding In The Aggretation of Fumed Silica Particles In Triglyceride Solvents," Journal of Colloid and Interface Science, vol. 527, May 12, 2018, pp. 1-9.

\* cited by examiner

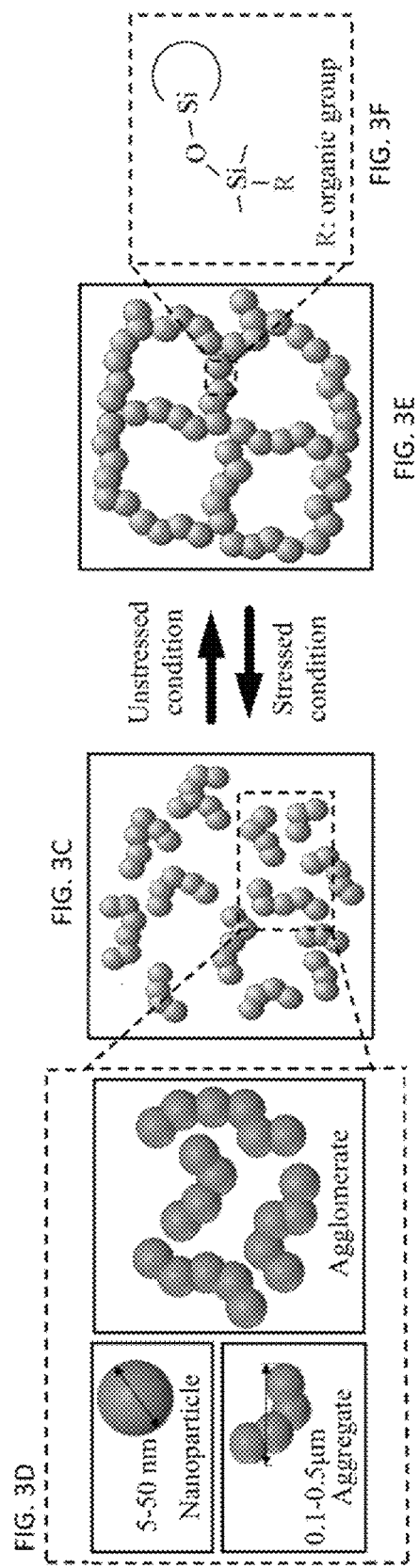

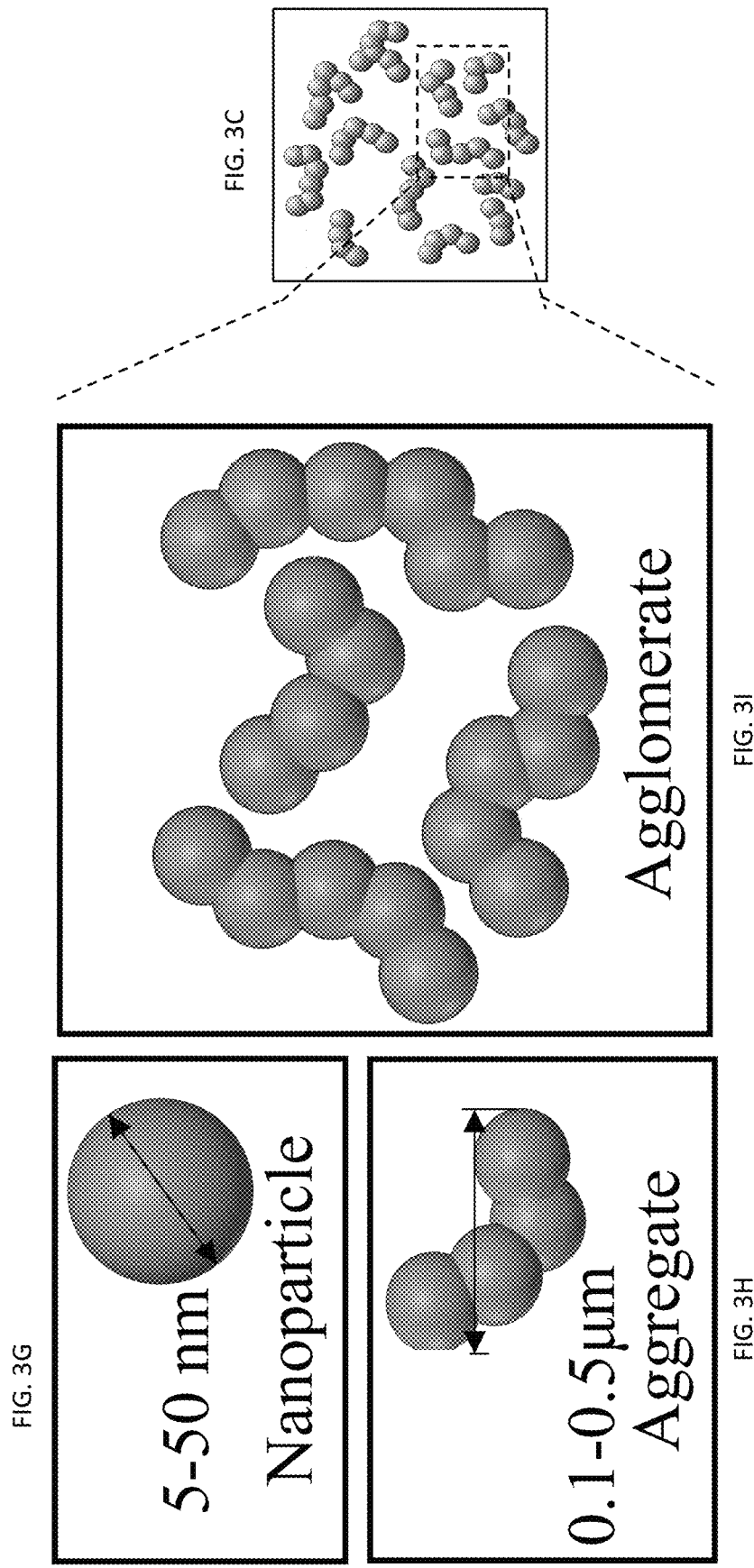

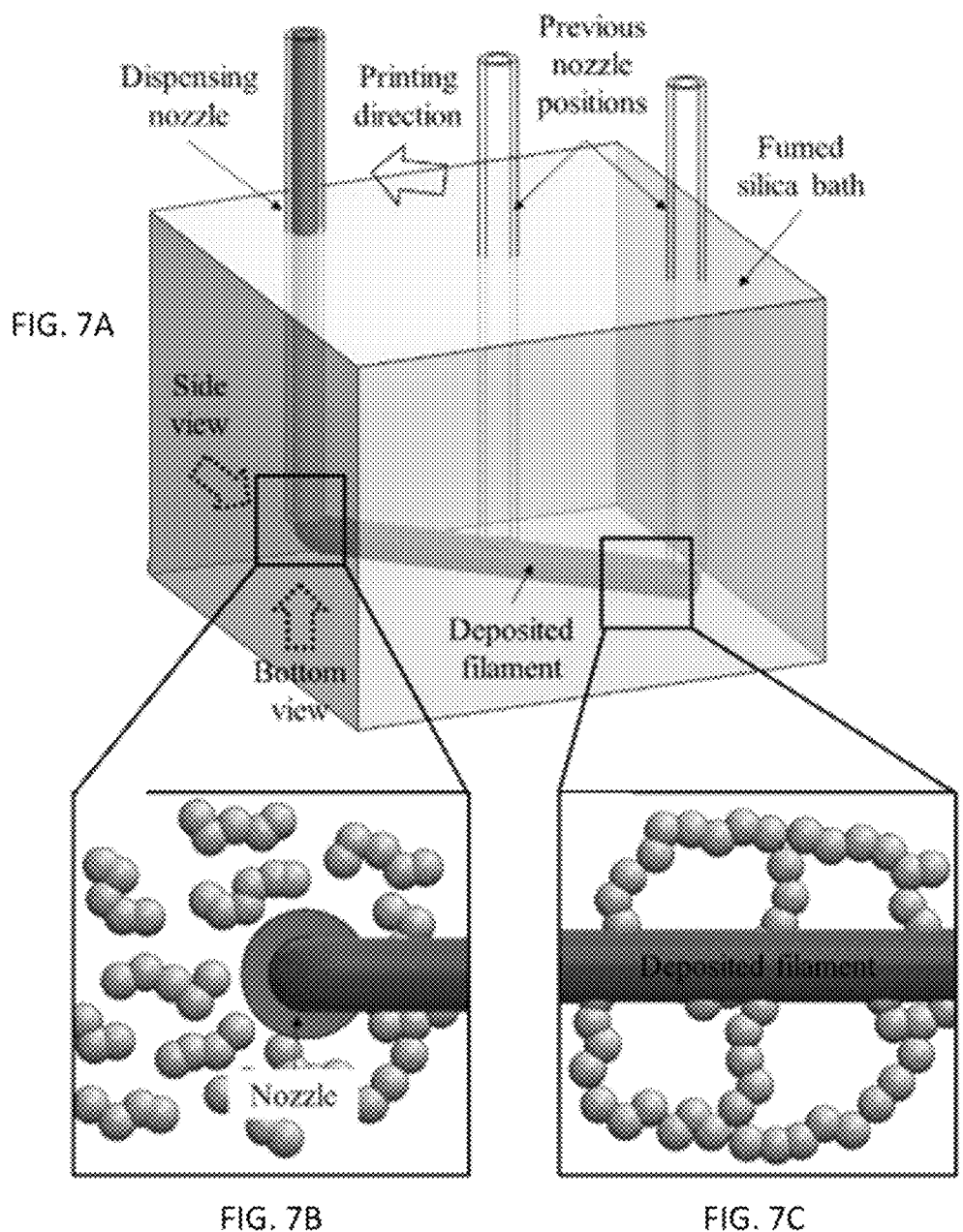

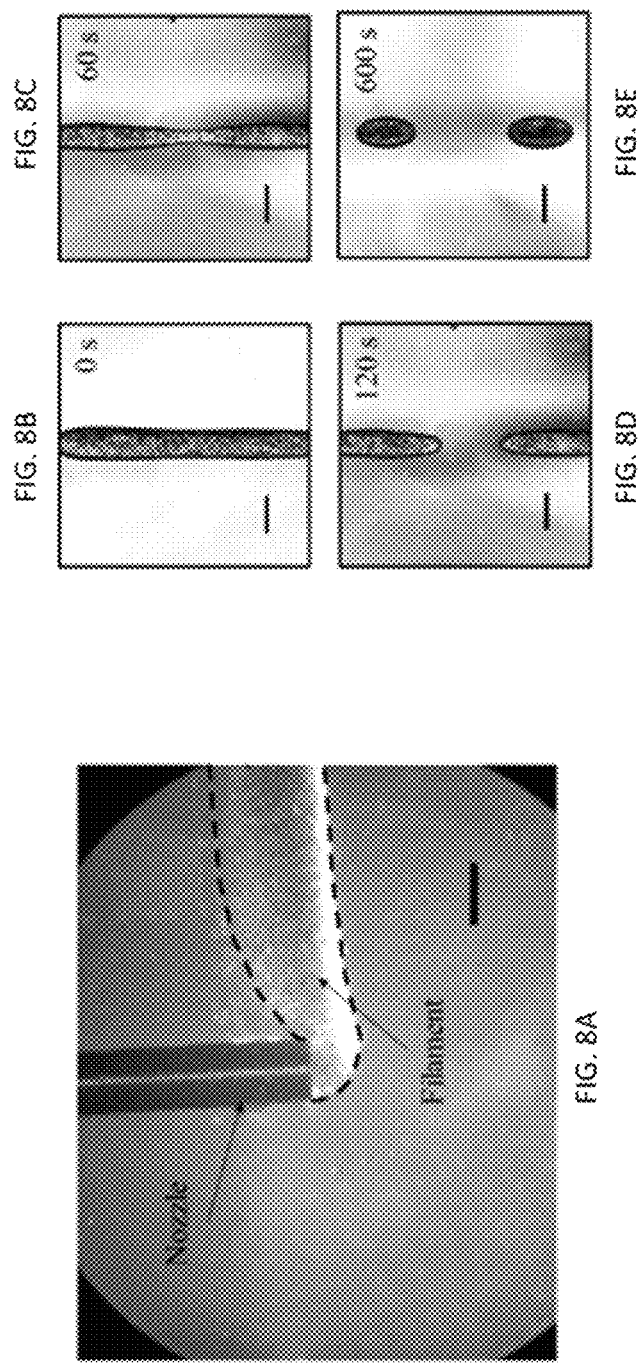

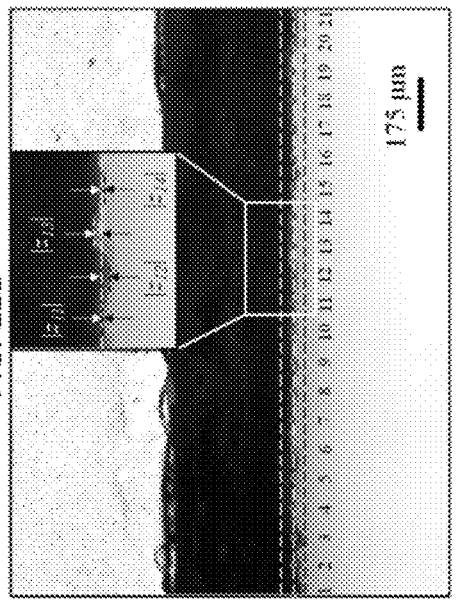
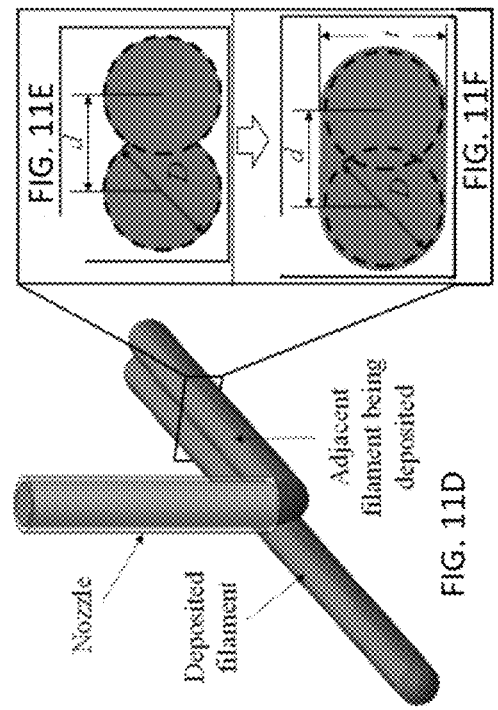
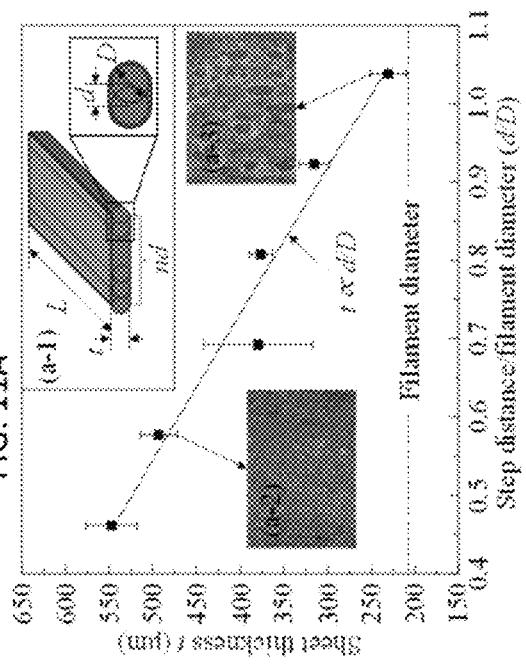
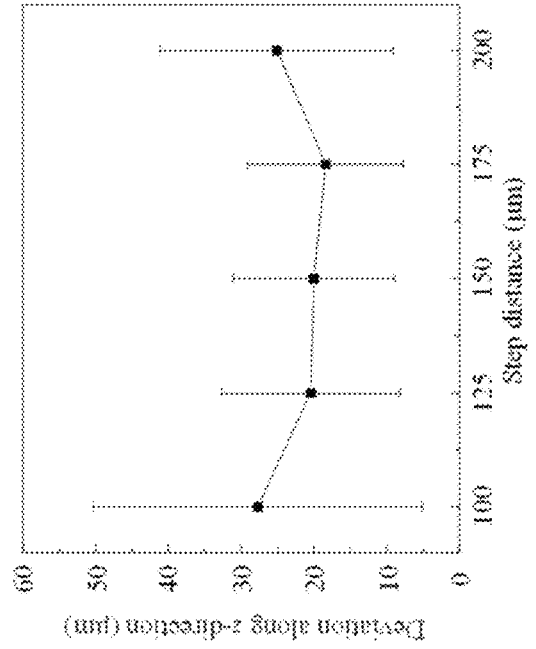
FIG. 11A
FIG. 11B
FIG. 11C
FIG. 11D
FIG. 11E
FIG. 11F

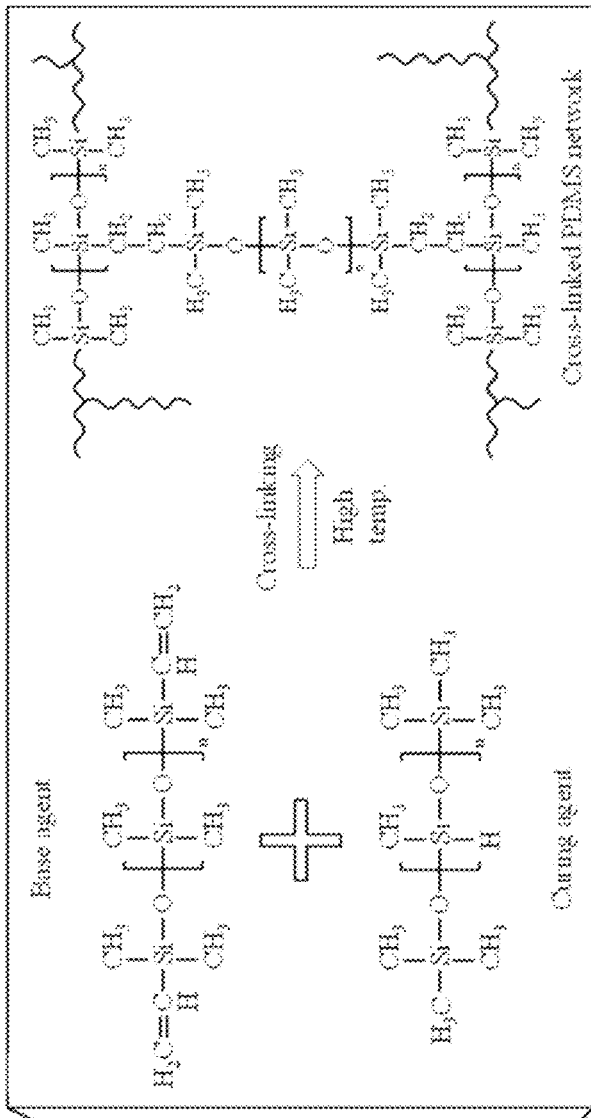
FIG. 12A
FIG. 12B
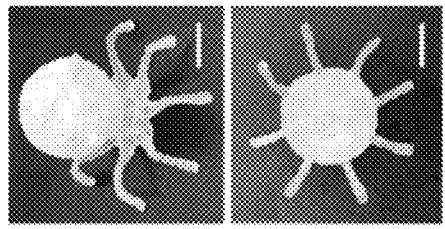
FIG. 12C
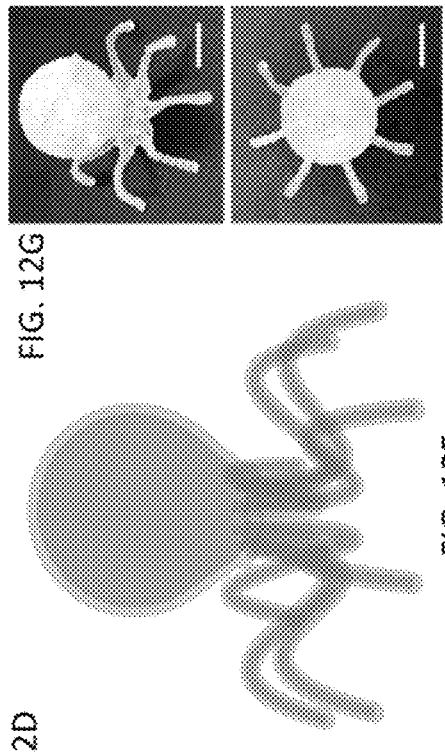
FIG. 12D
FIG. 12E
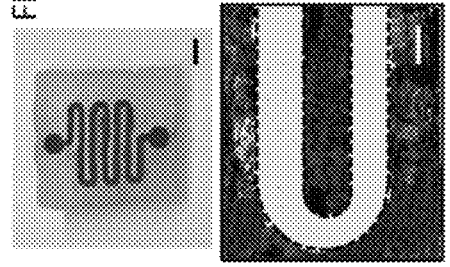
FIG. 12F
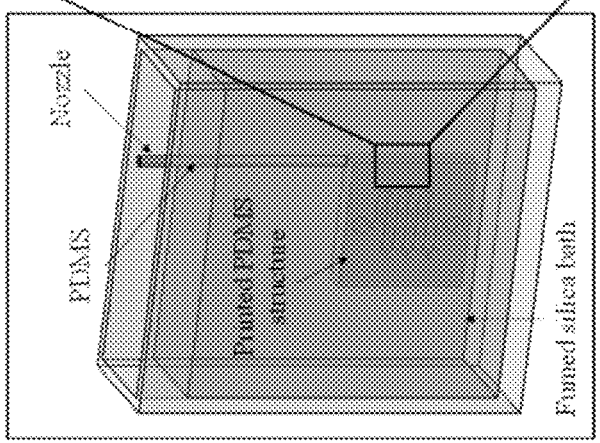
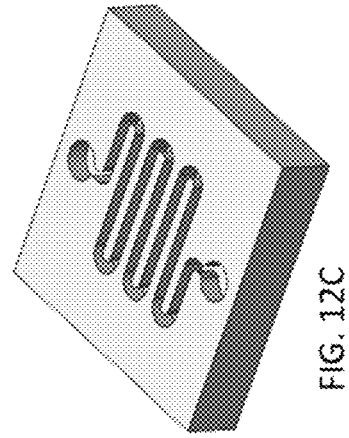
FIG. 12G
FIG. 12H

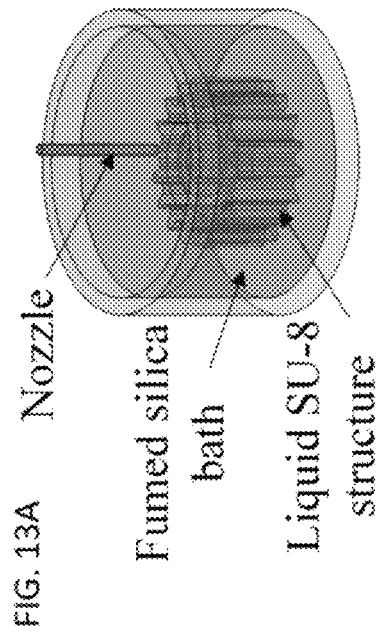
FIG. 13A Nozzle
Fumed silica bath
Liquid SU-8 structure
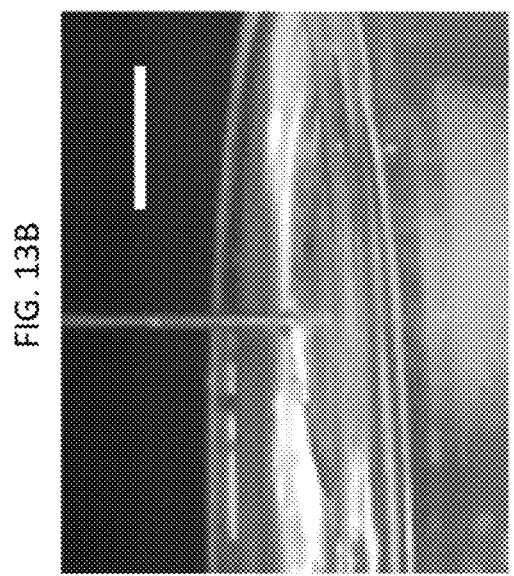
FIG. 13B
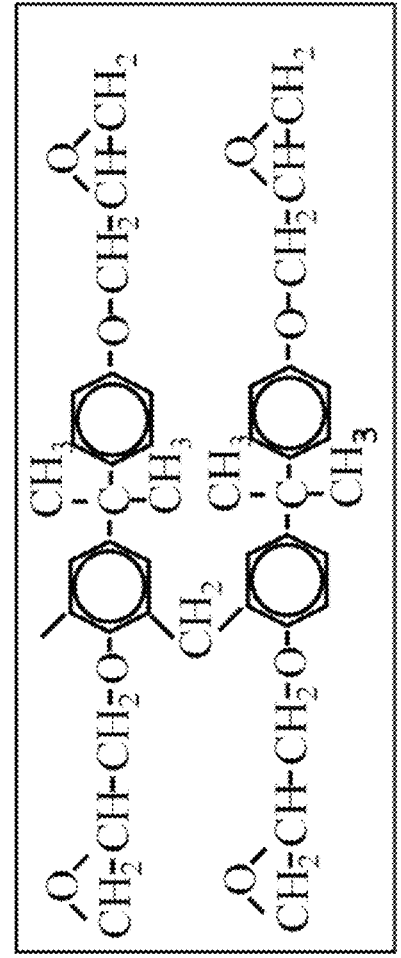
FIG. 13C

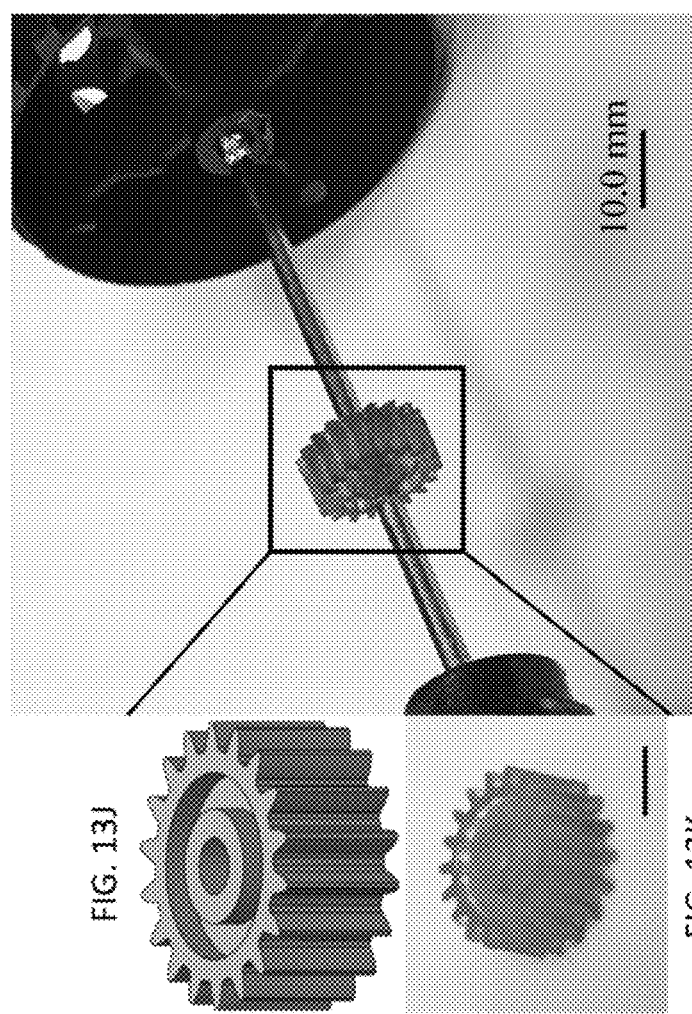

THREE-DIMENSIONAL PRINTING OF HYDROPHOBIC MATERIALS IN FUMED SILICA SUSPENSION

CROSS-REFERENCE TO RELATED APPLICATIONS

This application is a division of U.S. Non-Provisional patent application Ser. No. 16/707,087, filed Dec. 9, 2019 and titled "Three-Dimensional Printing of Hydrophobic Materials in Fumed Silica Suspension," which claims priority to, and the benefit of, U.S. Provisional Application Ser. No. 62/783,267, filed Dec. 21, 2018 and titled "Three-Dimensional Printing of Hydrophobic Materials in Fumed Silica Suspension," the entire contents of each of which are hereby incorporated herein by reference in their entireties for all purposes.

TECHNICAL FIELD

Embodiments described herein relate generally to additive manufacturing, and more particularly to freeform additive manufacturing of hydrophobic materials.

BACKGROUND

Additive manufacturing, also commonly known as three-dimensional (3D) printing, encompasses a range of technologies used to fabricate parts by adding material to build up the part rather than by subtracting unwanted material away from a bulk starting workpiece. For freeform 3D printing of functional structures, extrusion, sometimes known as direct ink writing, can be used due to its ease of implementation, high efficiency, and wide range of printable materials. However, conventional methods and compositions often require the concurrent printing of support structures, may result in poor inter-filament/intra-filament properties, and/or the printed article fails to achieve desired mechanical properties. Through applied effort, ingenuity, and innovation, solutions to improve such apparatuses, systems, and methods have been realized and are described in connection with embodiments of the present invention.

BRIEF SUMMARY

A freeform 3D printing methodology is disclosed for additive manufacturing using hydrophobic printing materials without the use of printed support structures. A hydrophobic ink is deposited three dimensionally in a hydrophobic fumed silica suspension and retains its structural shape during printing; since it retains its structural shape during printing, the deposited ink need not be cured until the whole printed structure is complete. According to some embodiments, various hydrophobic inks, including but not limited to polydimethylsiloxane (PDMS), SU-8 resin, and epoxy-based conductive inks, are printed in a fumed silica bath to form an intermediate 3D structure, and the intermediate 3D structure is then cured using one or more cross-linking approaches. In some embodiments, when looking at the inter-filament fusion and surface roughness of the final 3D printed structure, it is found the deposited filaments fuse well with each other and result in a final 3D structure having a smooth surface.

According to some embodiments of the provided method, the printing material, also known herein as "ink," can be directly printed in, injected into, or otherwise disposed within, and supported by, a hydrophobic yield-stress support bath to form an intermediate article in the support bath material. The intermediate article may be liquid or only partially solidified after being printed into the support bath material. The hydrophobic printing material is then further or fully solidified by causing cross-linking of monomers of the printing material, forming a finished article from the intermediate article.

In some embodiments, a method for three-dimensional printing of a finished article can be provided, the method comprising: defining a predetermined path through a yield-stress support bath, the predetermined path indicative of a volume of a finished article. In some embodiments, the method can comprise: dispensing a hydrophobic printing material along the predetermined path through the yield-stress support bath to 3D print an intermediate article. In some embodiments, the method can comprise: causing further or full solidification of the hydrophobic printing material, forming the finished article. In some embodiments, the method can comprise: causing cross-linking of the hydrophobic printing material by thermal curing of the intermediate article. In some embodiments, the method can comprise: causing cross-linking of the hydrophobic printing material by ultraviolet curing of the intermediate article. In some embodiments, the hydrophobic printing material comprises a cross-linking material. In some embodiments, the cross-linking material is at least one of PDMS, SU-8 resin, an epoxy-based conductive material, or combinations thereof. In some embodiments, the yield-stress support bath comprises a suspension of fumed silica dispersed in mineral oil. In some embodiments, at least one of said defining and/or said dispensing elements can be carried out by an apparatus comprising a reservoir configured to contain a supply of the hydrophobic printing material, a nozzle, and a computing device.

In some embodiments, the yield-stress support bath material can comprise between about 1.0% (w/v) and about 20.0% (w/v) fumed silica, e.g., fumed silica nanoparticles having a largest dimension between about 1 nm and about 100 nm, dispersed in a volume of mineral oil. In some embodiments, the yield-stress support bath material can comprise less than about 20% (w/v) of fumed silica. In some embodiments, the yield-stress support bath material can comprise greater than about 1% (w/v) of fumed silica. In some embodiments, the yield-stress support bath material can comprise between about 1% (w/v) and about 19% (w/v) of fumed silica, about 1% (w/v) and about 18% (w/v) of fumed silica, about 1% (w/v) and about 17% (w/v) of fumed silica, about 2% (w/v) and about 16% (w/v) of fumed silica, about 3% (w/v) and about 15% (w/v) of fumed silica, about 4% (w/v) and about 15% (w/v) of fumed silica, about 5% (w/v) and about 15% (w/v) of fumed silica, or about 2% (w/v) and about 15% (w/v) of fumed silica, inclusive of all values and ranges therebetween. In some embodiments, rheological properties of the yield-stress support bath material are suitable such that an intermediate article can be formed in the yield-stress support bath material from a hydrophobic printing ink without undergoing cross-linking of the hydrophobic printing ink until the intermediate material is fully formed. In some embodiments, an average diameter of the fumed silica nanoparticles is about 20 nm.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should be appreciated that terminology explicitly employed herein that also may appear in any disclosure incorporated by reference should be accorded a meaning consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3C illustrates exemplary nanoparticle agglomerates in a yield-stress support bath for 3D printing hydrophobic materials, according to an embodiment.

FIG. 3D illustrates exemplary sizes and form factors for nanoparticles in a yield-stress support bath for 3D printing hydrophobic materials, according to an embodiment.

FIG. 3E illustrates exemplary agglomerate organization and distribution in a yield-stress support bath for 3D printing hydrophobic materials in an unstressed condition, according to an embodiment.

FIG. 3F illustrates exemplary agglomerate organization and distribution in a yield-stress support bath for 3D printing hydrophobic materials in an unstressed condition, according to an embodiment.

FIG. 3G illustrates an example nanoparticle in a yield-stress support bath having a size of between about 5 nm and about 50 nm, according to embodiments.

FIG. 3H illustrates an example nanoparticle aggregate in a yield-stress support bath having a size of between about 0.1 µm and about 0.5 µm, according to embodiments.

FIG. 3I illustrates an example agglomerate of nanoparticle aggregates in a yield-stress support bath, according to embodiments.

FIG. 7A illustrates a system for 3D printing of functional inks in a fumed silica-containing yield-stress support bath, according to an embodiment.

FIG. 7B illustrates a close-up view of a printing nozzle of the system of FIG. 7A and the structure and order of the fumed silica-containing yield-stress support bath material surrounding the printing nozzle as the printing nozzle moves through the support bath, according to an embodiment.

FIG. 7C illustrates a close-up view of a deposited filament of build material disposed within the silica-containing yield-stress support bath of the system of FIG. 7A using the printing nozzle of FIG. 7B, and the structure and order of the fumed silica-containing yield-stress support bath material surrounding the deposited filament of build material, according to an embodiment.

FIG. 8A is a front-view image of a functional ink being deposited into a fumed silica-containing yield-stress support bath, according to an embodiment.

FIGS. 8B-8E illustrate a time-lapse image sequence of PDMS filament printed in a Laponite RD bath and the variation in morphology over a ten-minute period, where FIG. 8B is taken at 0 seconds, FIG. 8C is taken at 60 seconds, FIG. 8D is taken at 120 seconds, and FIG. 8E is taken at 600 seconds.

FIG. 8G is taken at 0 seconds, FIG. 8H is taken at 60 seconds, FIG. 8I is taken at 1 hour, and FIG. 8J is taken at 24 hours.

FIG. 11A is a graphical representation of sheet thickness as a function of the ratio of step distance to filament diameter.

FIG. 11B is a cross-sectional image of a 3D printed sheet printed using hydrophobic material in a yield-stress support bath.

FIG. 11C is a graphical representation of deviation along the z-direction as a function of step distance.

FIG. 11D is a schematic illustration of inter-filament bonding formation during the printing of hydrophobic material into a sheet in a yield-stress support bath, according to one possible mechanism.

FIG. 11E illustrates a cross-section of two adjacently deposited filaments from the illustration of FIG. 11D that have not fused together well.

FIG. 11F illustrates a cross-section of two adjacently deposited filaments from the illustration of FIG. 11D that have fused together well.

FIG. 12A is a schematic illustration of a system and process for 3D printing a PDMS structure in a fumed silica yield-stress support bath, according to an embodiment.

FIG. 12B is a schematic illustration of a process for cross-linking the printed PDMS structure of FIG. 12A once the PDMS structure is fully printed, according to an embodiment.

FIG. 12C is a schematic illustration of a PDMS fluidic microchip for printing according to the system and method of FIG. 12A, according to an embodiment.

FIG. 12D is an image of the PDMS fluidic microchip printed according to the system and method of FIG. 12A, according to an embodiment.

FIG. 12E is a zoomed in image of a microfluidic channel of the microchip of FIG. 12D.

FIG. 12F is a schematic illustration of an octopus to be printed from PDMS according to the system and method of FIG. 12A, according to an embodiment.

FIG. 12G is a perspective view of the PDMS octopus 3D printed into a yield-stress bath according to the schematic design of FIG. 12F.

FIG. 12H is a top view of the PDMS octopus 3D printed into a stress-yield bath according to the schematic design of FIG. 12F.

FIG. 13A is a schematic illustration of an exemplary SU-8 gear structure, according to an embodiment.

FIG. 13B is an image of a yield-stress support bath into which the SU-8 gear structure of FIG. 13A can be printed, according to an embodiment.

FIG. 13C is a chemical structure of an exemplary SU-8 monomer operable for printing the SU-8 gear structure of FIG. 13A into the yield-stress support bath of FIG. 13B, according to an embodiment.

FIG. 13I is an image of the 3D printed, cross-linked SU-8 gear from FIG. 13D dispensed about an axle of a robotic vehicle.

FIG. 13J illustrates the initial design for the 3D printed SU-8 gear structure of FIG. 13A.

FIG. 13K is an image of the 3D printed, cross-linked SU-8 gear from FIG. 13I for comparison to the initial design of FIG. 13J.

DETAILED DESCRIPTION

Figure 1:
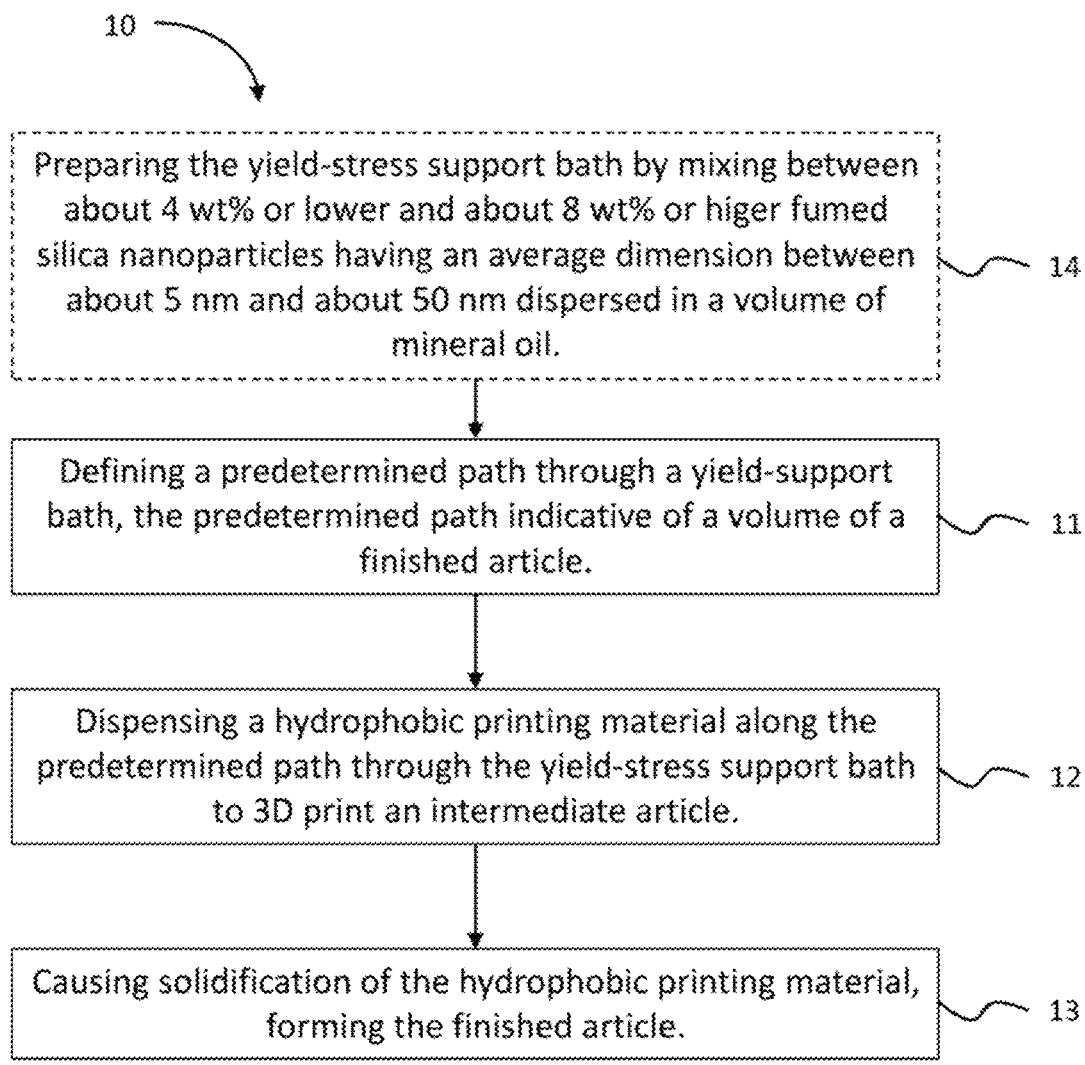
FIG. 1 illustrates a process flow diagram of a method of 3D printing, according to an embodiment.

Embodiments described herein relate generally to methods, systems, and apparatuses for three-dimensional (3D) printing (additive manufacturing) of hydrophobic parts by extrusion printing a hydrophobic ink in a hydrophobic yield-stress support bath.

During extrusion printing, functional ink materials typically must have either rapid solidification properties or self-supporting properties to keep the shape as extruded, which constrains the selection of printable materials and affects the inter-filament and intra-filament properties of the printed article as well as overall mechanical properties. However, many materials either will not remain substantially fluid after printing and before simultaneous curing of the whole article, or will remain a fluid but will not retain the shape of the article being printed. Therefore, there is a continued desire in these and other fields for a 3D printing approach, and associated ink and bath compositions, as well as associated apparatuses, by which an article can be printed such that the ink (e.g., the printed fluid) both remains fluid and retains the shape of the printed article before curing.

In the fields of robotics, microfluidics, bioprocessing, electrochemical sensors, and the like, hydrophobic materials are often used in the manufacture of hydrophobic parts. Hydrophobic materials typically cannot be used in conventional 3D printing processes, making it difficult to manufacture hydrophobic parts, especially complex, small, and/or monolithic parts.

To overcome this challenge, a yield-stress support bath-assisted printing-then-solidification extrusion strategy has been contemplated and is described herein as an alternative methodology to print functional materials. According to some embodiments, a method can be provided by which a yield-stress support bath is utilized to temporarily hold a printed 3D structure in situ, the printed 3D structure not being cured until printing of the whole structure is complete. While possible hydrophilic yield-stress support bath materials were contemplated, such as granular microgels, Laponite nanoclay particles, and gelatin particles, for extrusion printing of aqueous materials, these yield-stress support bath materials were found to often be deficient. When a bath material is hydrophilic, the interfacial tension effect may prevent extrusion from printing fine features from hydrophobic liquids as seen from the Plateau-Rayleigh instability principle. If printing in a hydrophilic bath, printing continuous filaments of hydrophobic functional ink materials may easily result in discontinuous segments or droplets. For hydrophobic support bath-based extrusion printing, a self-assembled micro-organogel bath was also contemplated for printing silicone structures, however, this micro-organogel bath was found to be sensitive to temperature changes and loses its supporting function, for instance if the working temperature is higher than about 60° C., which reduces the applicability of that approach for printing of high cross-linking/solidification temperature ink materials. As 3D printing technologies continue to mature, there is a demand for more versatile approaches which are compatible with a wider range of 3D printing materials to fabricate more complex prototypes and end-use parts with a broad range of properties and features.

However, there exists no conventional approach for extrusion printing of hydrophobic materials. Injection molding and other fabrication approaches often require a time consuming molding process. Thus, there is a long-felt need in these and other fields for a robust approach for printing hydrophobic parts using hydrophobic materials.

The emergence of three-dimensional (3D) printing provides a powerful tool for on-demand fabrication of complex 3D functional structures. For freeform 3D printing of functional structures, extrusion, sometimes known as direct ink writing, is one of the commonly used strategies due to its easy implementation, high efficiency and wide range of printable materials. During extrusion printing, functional ink materials must typically have either rapid solidification properties or self-supporting properties to keep the shape as extruded, which constrains the selection of printable materials and constricts the applicability of the process. To overcome this challenge, a yield-stress support bath-assisted printing-then-solidification extrusion strategy has been contemplated as an alternative methodology to print functional materials. During printing, a yield-stress support bath is utilized to temporarily hold a printed 3D structure in situ, which is not cured until printing of the whole structure is complete.

Various hydrophilic yield-stress support bath materials, such as granular microgels, Laponite nanoclay particles, and gelatin particles, have been contemplated for extrusion printing of aqueous materials. When a bath material is hydrophilic, the interfacial tension effect may prevent extrusion from printing fine features from hydrophobic liquids as seen from the Plateau-Rayleigh instability principle. If printing in a hydrophilic bath, printed continuous filaments of hydrophobic functional ink materials may easily result in discontinuous segments or droplets. For hydrophobic support bath-based extrusion printing, a self-assembled micro-organogel bath was investigated to print silicone structures, however, such a micro-organogel bath is sensitive to temperature changes and loses its supporting function at elevated working temperatures, such as higher than about 60° C., constraining its applications for printing of high cross-linking/solidification temperature ink materials.

According to some embodiments, a support bath material for hydrophobic ink printing can and/or should: 1) be or comprise a structured fluid with a short response time thixotropic property and have a solid-liquid transition upon a certain yield stress, which enables it to easily and rapidly transition between liquid and solid states based upon different shear stress conditions, 2) be hydrophobic, which may eliminate the interfacial tension effect during printing, and 3) have thermal stability and UV transparency to facilitate 3D printing of various hydrophobic functional inks with different cross-linking mechanisms.

As such, in some embodiments, a fumed silica/mineral oil system is provided as the support bath, in which fumed silica powders are mixed with mineral oil to prepare a yield-stress suspension. Without wishing to be bound by any particular theories, since a hydrophobic mineral oil is used as the solvent, the interfacial tension between the support bath material and hydrophobic ink materials may be lower, e.g., much lower, than that in aqueous solvent-based support baths, which may make it more feasible to fabricate complex 3D functional structures from hydrophobic liquids.

Referring now to FIG. 1, a method 10 for 3D printing of a finished article can include defining a predetermined path through a yield-stress support bath, the predetermined path indicative of a volume of a finished article, at 11. The method can include dispensing a hydrophobic printing material along the predetermined path in the yield-stress support bath to 3D print an intermediate article, at 12. In some embodiments, the hydrophobic build material can be injected, spun, inserted, communicated, dropped, conveyed, or otherwise dispensed within the yield-stress support bath such that the yield-stress support bath can facilitate at least partial formation of the article. Regardless of the particular manner in which the hydrophobic printing material is dispensed within the yield-stress support bath, the yield-stress support bath can provide sufficient support for the at least partial formation of the intermediate article. According to some embodiments, the yield-stress support bath can provide sufficient support for the at least partial formation of the intermediate article such that the intermediate article is formed free of printed support structures. Such support structures are used extensively across the array of conventional additive manufacturing and 3D printing techniques, and are always required to be trimmed away after formation of the intermediate or finished article. By forming the intermediate article without printed supports in the yield-stress support bath, the methods described herein can eliminate the labor-intensive, costly, and time-consuming process of trimming away the printed support structures once the article is fully formed.

According to some embodiments, the method 10 can further comprise causing solidification of the hydrophobic printing material, forming the finished article, at 13. In some embodiments, the method 10 can include causing cross-linking of the hydrophobic printing material by thermal curing of the intermediate article. In some embodiments, the method 10 can include causing cross-linking of the hydrophobic printing material by ultraviolet curing of the intermediate article. In some embodiments, the hydrophobic printing material can include a cross-linking material. In some embodiments, the cross-linking material, e.g., the functional ink, can include at least one of PDMS, SU-8 resin, an epoxy-based conductive material, or combinations thereof. In some embodiments, the yield-stress support bath can include a suspension of fumed silica dispersed in mineral oil. In some embodiments, at least one of the defining and the dispensing is carried out by an apparatus comprising a reservoir configured to contain a supply of the hydrophobic printing material, a nozzle, and a computing device.

In some embodiments, the yield-stress support bath material can comprise between about 1.0% (w/v) and about 20.0% (w/v) fumed silica, e.g., fumed silica nanoparticles having a largest dimension (e.g., a diameter) between about 1 nm and about 100 nm, dispersed in a volume of mineral oil. In some embodiments, the yield-stress support bath material can comprise less than about 20% (w/v) of fumed silica. In some embodiments, the yield-stress support bath material can comprise greater than about 1% (w/v) of fumed silica. In some embodiments, the yield-stress support bath material can comprise between about 1% (w/v) and about 19% (w/v) of fumed silica, about 1% (w/v) and about 18% (w/v) of fumed silica, about 1% (w/v) and about 17% (w/v) of fumed silica, about 2% (w/v) and about 16% (w/v) of fumed silica, about 3% (w/v) and about 15% (w/v) of fumed silica, about 4% (w/v) and about 15% (w/v) of fumed silica, about 5% (w/v) and about 15% (w/v) of fumed silica, or about 2% (w/v) and about 15% (w/v) of fumed silica, inclusive of all values and ranges therebetween. In some embodiments, a rheological property of the yield-stress support bath material is suitable such that an intermediate article can be formed in the yield-stress support bath material from a hydrophobic printing ink without undergoing cross-linking of the hydrophobic printing ink until the intermediate material is fully formed and without undergoing deformation or substantially without undergoing deformation before the hydrophobic printing ink undergoes cross-linking. In some embodiments, an average diameter of the fumed silica nanoparticles is about 20 nm. Many other compositions such as the fumed silica/silica oil suspensions or any hydrophobic inorganic particle suspensions with shear-thinning and thixotropic properties, were tested, are contemplated, and are within the scope of the current disclosure.

The method 10 can, optionally, comprise preparing the yield-stress support bath by mixing a mass of fumed silica, such as fumed silica nanoparticles, e.g., fumed silica nanoparticles having an average dimension between about 5 nm and about 50 nm, in a volume of oil, e.g., mineral oil, at 14. The mass to volume concentration of fumed silica in oil can include any of the concentrations or concentration ranges disclosed above, as well as any values or ranges therebetween or therewithin.

This method 10 can be carried out for the fabrication of parts having arbitrary dimensions, an arbitrary form factor, in arbitrary orientations. In other words, the manufacturing complexity, costliness, and time necessary to carry out fabrication is at least partially decoupled from the shape, dimensions, and form factor complexity of the article being fabricated. The implications for practical applications are surprising and significant. Conversely, 3D printing a hydrophobic article, e.g., an article having high complexity, according to conventional processes is typically not possible. The 3D printing methods, e.g., the method 10, described herein are capable of printing hydrophobic build materials, can eliminate the need for a particular printed article orientation, are not rendered more time-consuming or costly with increasing article complexity, and do not require support structures to be printed concurrent to the printing of the article, meaning less 3D printing/build material is wasted and the printed support structure trimming step is eliminated completely. The advantages in terms of production cost and time for 3D printed articles, among other advantages associated with these methods, are clear.

Figure 2:
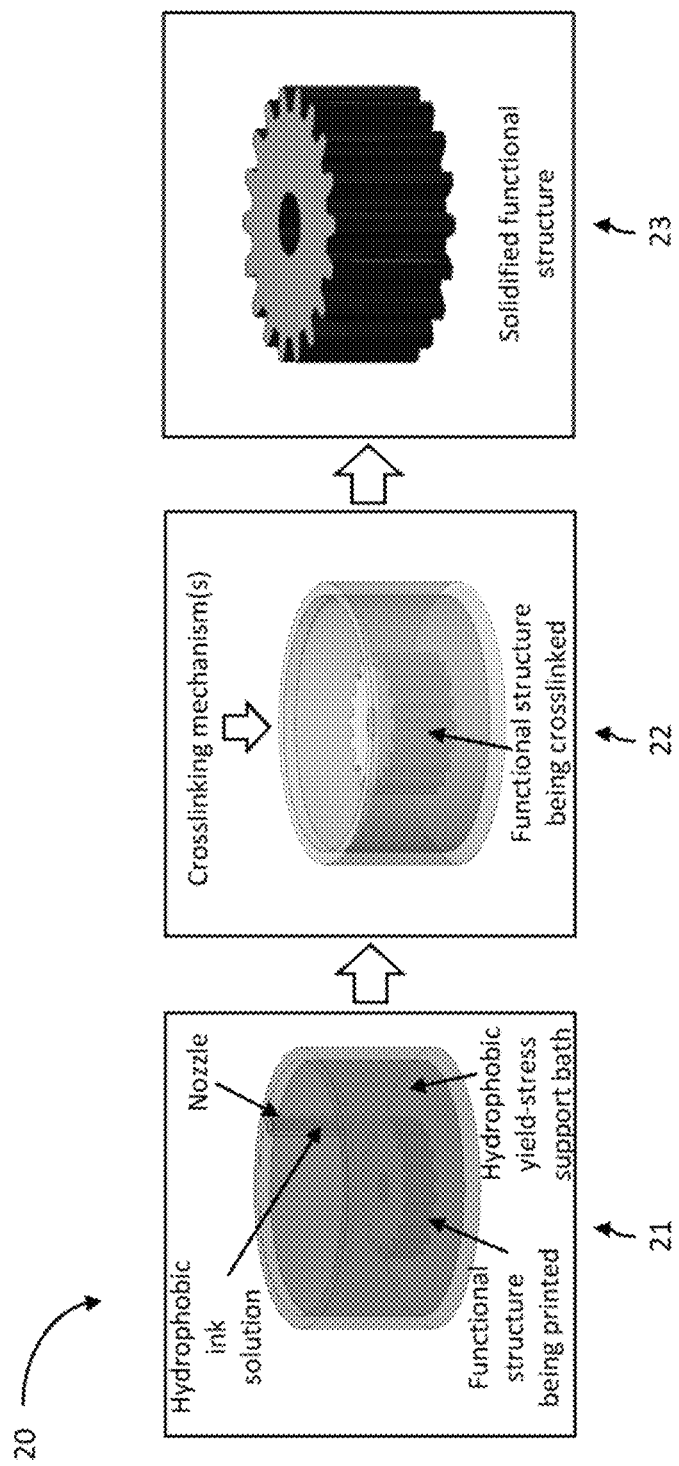
FIG. 2 illustrates a system and apparatus for 3D printing hydrophobic materials in a yield-stress support bath, according to an embodiment.

Referring now to FIG. 2, a method 20 for 3D printing of a finished article can include dispensing a hydrophobic material into a yield-stress support bath to form an intermediate article, at 21. In some embodiments, dispensing 21 can be carried out by an apparatus including a reservoir for containing a volume of a functional ink solution, for instance a hydrophobic printing material. The apparatus can further include a nozzle configured to dispense a portion of the hydrophobic printing material into a yield-stress support bath. The apparatus can further include a computing device, such as one or more processors and one or more memory devices including one or more computer programs. In some embodiments, the computing device can be configured to control the dispensing of the hydrophobic printing material into the yield-stress support bath. In particular, the computing device can be configured to move the nozzle along a predetermined path about the yield-stress support bath in order to dispense a predetermined volume of the hydrophobic printing material into the yield-stress support bath to form the intermediate material.

Figure 3A:
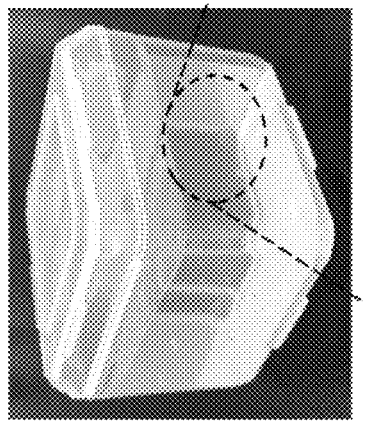
FIG. 3A illustrates a yield-stress support bath for 3D printing hydrophobic materials, according to an embodiment.
Figure 3B:
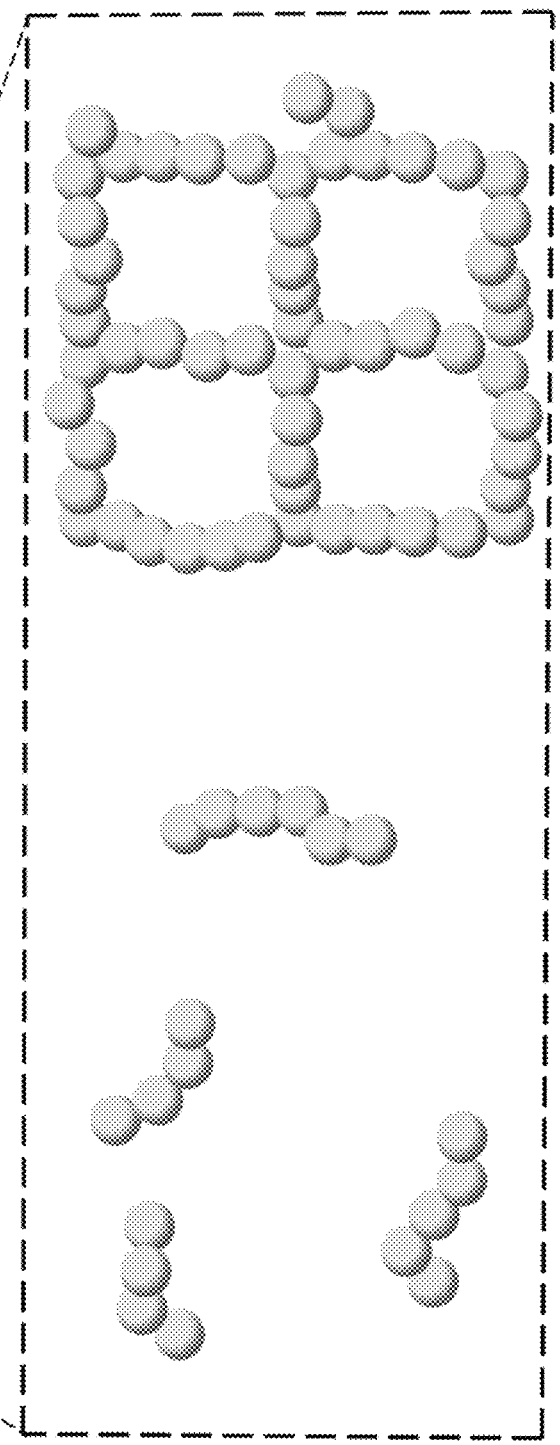
FIG. 3B illustrates exemplary nanoparticle agglomerates in the yield-stress support bath of FIG. 3A.

Referring now to FIGS. 3A-3I, a fumed silica-based suspension can be prepared as a yield-stress support bath suspension. A fumed silica/mineral oil suspension, prepared according to some embodiments, is illustrated in FIG. 3A. In some embodiments, the fumed silica nanoparticles can form aggregates, agglomerates and/or other structures in the yield-stress support bath suspension, as shown in FIGS. 3B and 3C. As illustrated in FIGS. 3D and 3G, in some embodiments, fumed silica nanoparticles can be the basic unit to form fumed silica powders, which have spheroid-like shapes with an average diameter of between about 1 nm to about 100 nm, between about 5 nm and about 50 nm, or the like. Without wishing to be bound by any particular theory, at solid state, adjacent fumed silica nanoparticles may connect with each other by intermolecular interactions to form aggregates with an average aggregate size of between about 100 nm and about 500 nm, as shown in FIGS. 3D and 3H, which may be a minimum component of the fumed silica suspension. When mixed with mineral oil, these aggregates may disperse uniformly or substantially uniformly in the suspension and adjacent aggregates may cluster loosely by weak forces such as van der Waals forces and/or capillary forces to form agglomerates, as shown in FIGS. 3E and 3I. In some embodiments, at static state, adjacent agglomerates may connect with each other by intermolecular interactions between organic groups, as shown in FIG. 3F, to form stable 3D network structures (e.g., as shown in FIG. 3E), which may demonstrate a solid-like state. Thus, the fumed silica suspension presents a yield-stress property and behaves in a solid-like manner when, for instance, there are no external forces present. In contrast, under a stress condition, the external shear stress may break up some or all of these inter-agglomerate bonds, which may make the stable 3D network structures return to the loose agglomerate debris, as shown in FIG. 3C. This disrupted state microstructure of agglomerates enables the fumed silica suspension to behave like a liquid under a stress condition, e.g., when an external shear stress is applied. Without wishing to be bound by any particular theory, this solid/liquid transition of microstructures upon different stress conditions may allow the fumed silica suspension to transition between solid and liquid states as desired, allowing this suspension of fumed silica in mineral oil to be used as a support bath material for functional ink printing applications.

Figure 4:
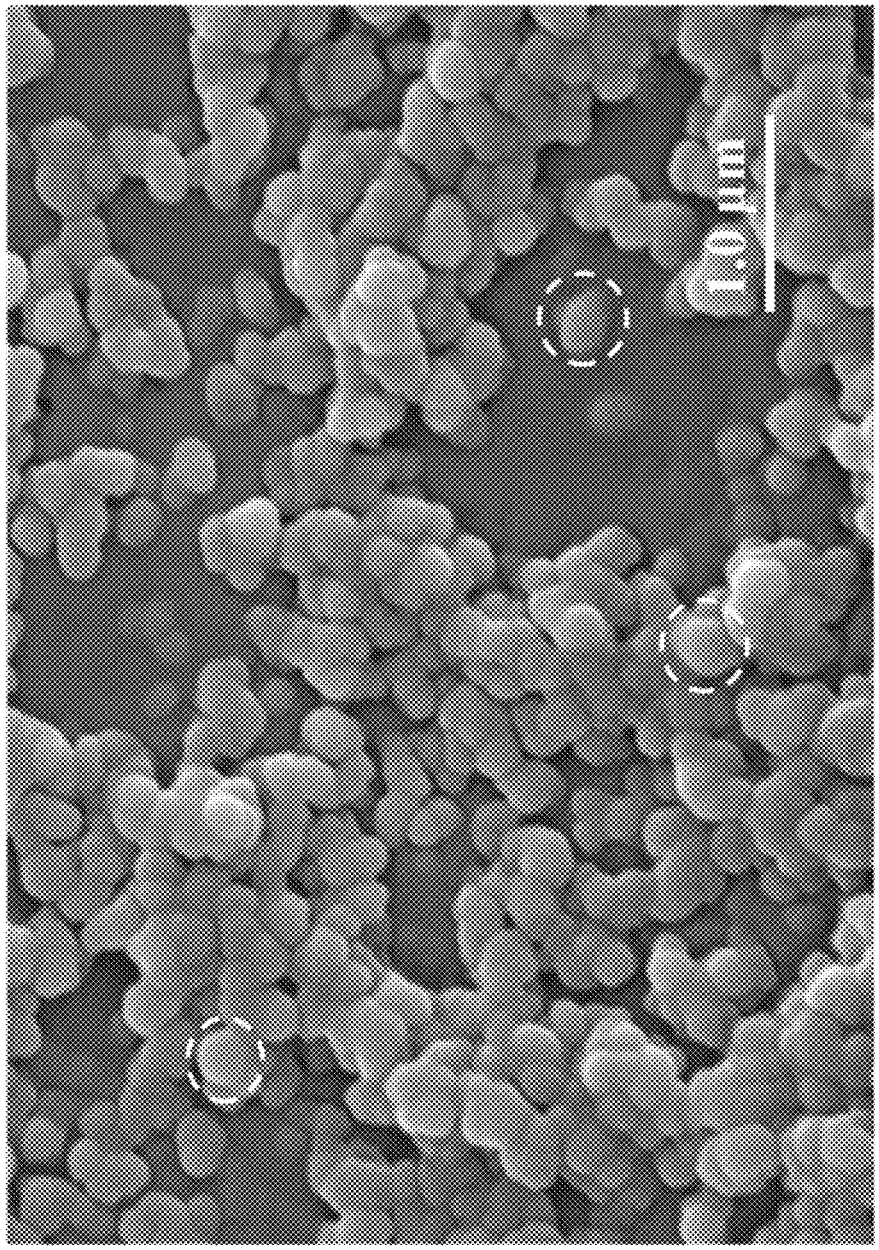
FIG. 4 is an image of solid-like fumed silica aggregates dispersed uniformly in a solvent for use in a yield-stress support bath.

Referring now to FIG. 4, a micrograph image of a fumed silica suspension shows the dispersal of fumed silica particles in the mineral oil. To investigate the microstructures of the fumed silica/mineral oil suspension, morphological investigations were performed using variable-pressure scanning electron microscopy (VP SEM). FIG. 4 illustrates the morphology of solid-like fumed silica aggregates dispersed uniformly or substantially uniformly in mineral oil solvent. The spheroid-shaped particles, marked in FIG. 4, that are present in the fumed silica aggregates may be a fundamental unit of the suspension. A fumed silica aggregate may comprise several fumed silica nanoparticles, and the nanostructures of the fumed silica aggregates are imaged using a transmission electron microscope (TEM), as shown in the inset of FIG. 4, in which the fumed silica nanoparticles can be observed with an average diameter of around 20 nm. However, other average dimensions are possible, as disclosed herein. In the unstressed (static) condition, numerous fumed silica aggregates cluster together to form the solid-state 3D network structures shown in FIG. 4, causing the solid-like behavior of the fumed silica suspension.

Figure 5A:
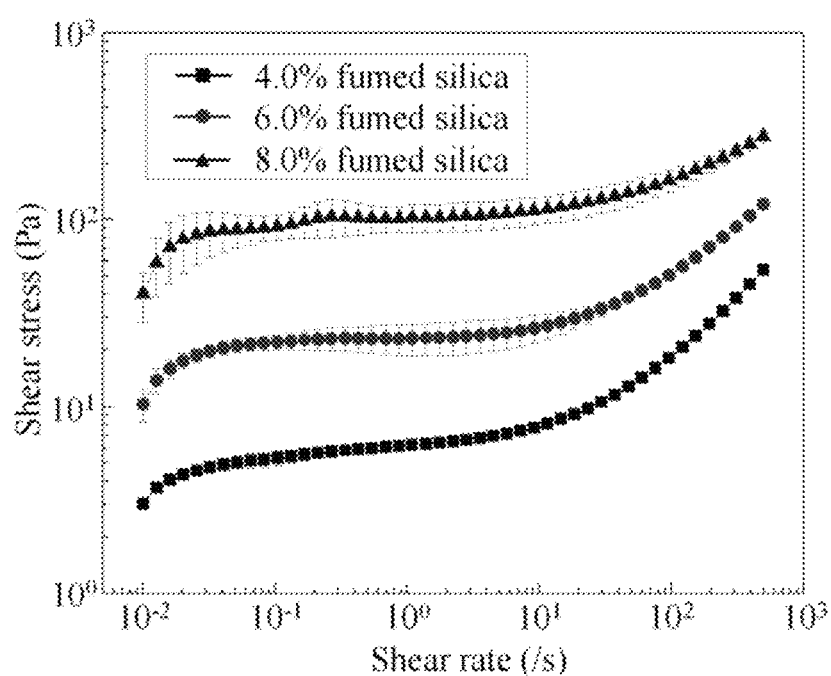
FIG. 5A illustrates graphically the relationship between shear stress and shear rate for yield-stress support baths having various fumed silica concentrations.
Figure 5B:
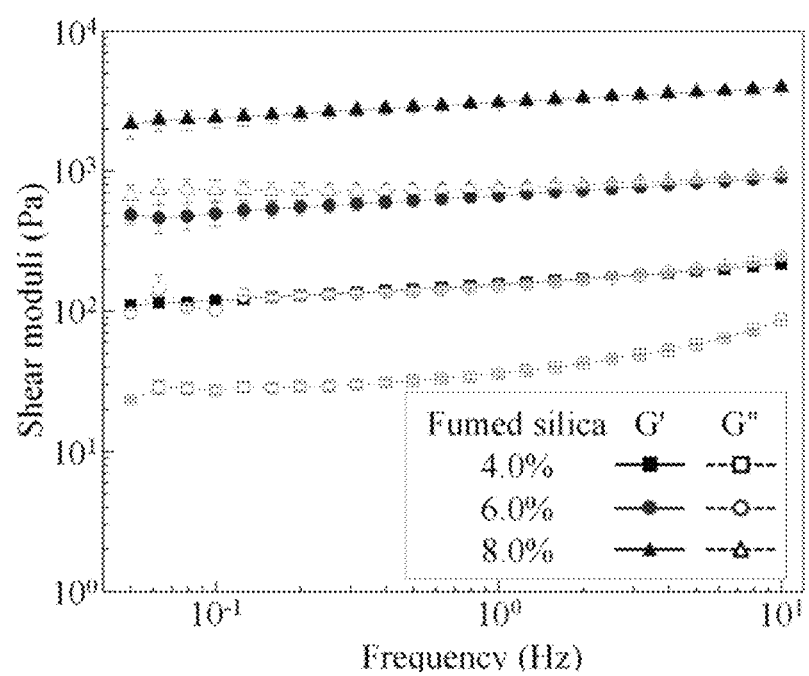
FIG. 5B illustrates graphically the relationship between shear moduli and frequency during oscillatory tests of yield-stress support baths having various fumed silica concentrations.

Referring now to FIGS. 5A and 5B, rheological properties of fumed silica suspensions at different fumed silica concentrations are presented. To further illustrate how this suspension with solid/liquid transitions can be used as a support bath material, the rheological properties of the fumed silica suspension were investigated. Thus, different rheological experiments were performed on fumed silica suspensions at different concentrations. First, the yield-stress property was investigated by steady sweeping fumed silica suspensions at different shear rates and measuring the shear stresses accordingly. The results of this analysis are illustrated in FIG. 5A. For instance, FIG. 5A illustrates that, with the increase of shear rates, the resulting shear stresses of different concentration fumed silica suspensions also increase, while at low shear rates such as 0.01/s, the measured shear stress is still relatively high, indicating the existence of a critical yield stress in the fumed silica suspensions. Without wishing to be bound by any particular theory, this yield stress may represent the threshold between liquid and solid states of fumed silica suspensions meaning that, when the applied stress is higher than the yield stress, the suspension behaves like a liquid, and that otherwise the suspension behaves like a solid. Additionally, in some embodiments, the yield stress may increase with the fumed silica concentration, as shown in FIG. 5A. By fitting shear rate and stress data to the Herschel-Bulkley model: $\tau=\tau_0 \pm k \dot{\gamma}^n$ where $\tau$ is the shear stress, $\dot{\gamma}$ is the shear rate, $\tau_0$ is the yield stress, k is the consistency index, and n is the flow index, the shear stresses of the fumed silica suspensions at concentrations of, for instance, about 4.0%, about 6.0%, and about 8.0% (w/v) can be calculated as being, respectively, about 4.0 Pa, about 17.0 Pa, and about 79.0 Pa. As a result, fumed silica suspensions with various yield-stress values can be achieved by varying the concentration of fumed silica in suspension.

Oscillatory tests were also performed to investigate the relationship between shear moduli and frequency, the results of at least some of which are shown in FIG. 5B. From FIG. 5B, it is shown that, for fumed silica suspensions with different concentrations, the storage modulus is higher than the loss modulus, which may indicate that fumed silica suspensions show solid-like behavior under sheared condition, which may help maintain the deposited shape in situ during printing. Besides, both storage modulus and loss modulus increase with the increase of fumed silica concentration, which may affect the filament morphology in the support bath.

Figure 6A:
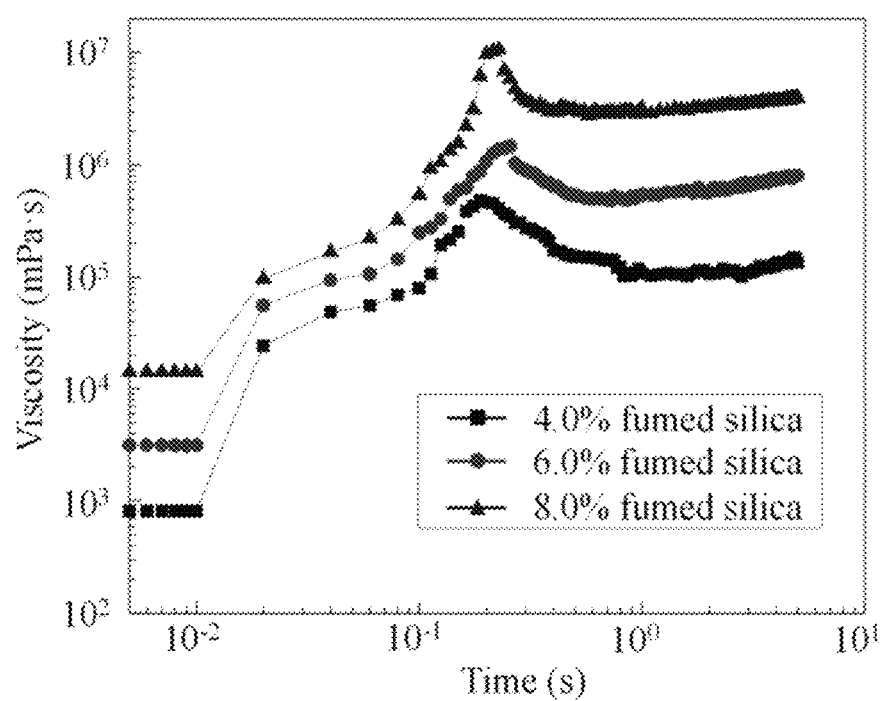
FIG. 6A illustrates graphically the relationship between viscosity change and response time for yield-stress support baths having various fumed silica concentrations.

Referring now to FIG. 6A, thixotropic time scale was investigated to evaluate the transition efficiency between liquid and solid states of the fumed silica suspensions, which determines whether deposited features can be effectively entrapped in the support bath during printing. FIG. 6A illustrates the relationship between the viscosity change and response time, according to at least some embodiments. The fumed silica suspensions were pre-sheared to a steadily sheared state, and then the shear rate decreased significantly. During this period, the viscosity change was recorded, as shown in FIG. 6A. From FIG. 6A, due to the shear-thinning effect, the microstructures of fumed silica present a disrupted state under pre-shear, giving fumed silica suspensions relatively low viscosity (e.g., from approximately 1 Pa·s to 10 Pa·s at different concentrations), however, after the shear rate is decreased dramatically, the microstructures of fumed silica rapidly recover to the solid-like 3D network structures as shown in FIG. 4, resulting in significant increase in viscosity (e.g., from approximately $10^3$ Pa·s to $10^4$ Pa·s at different concentrations) in only 0.2 s.

Figure 6B:
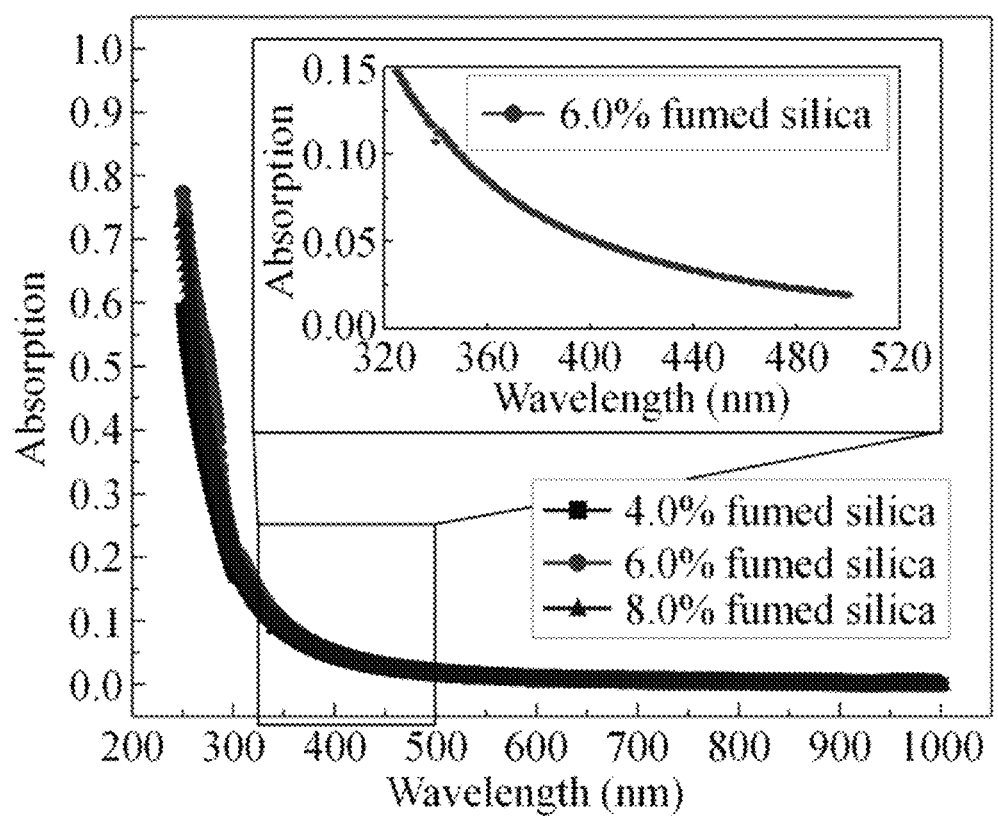
FIG. 6B illustrates graphically the relationship between UV absorption and wavelength for yield-stress support baths having various fumed silica concentration.

In addition to these basic rheological properties of support bath materials as aforementioned, a desired bath material should have other functional properties to facilitate the 3D printing of various functional inks with different cross-linking mechanisms. For example, ultraviolet (UV) radiation cross-linking and thermal cross-linking are two possible cross-linking mechanisms contemplating for solidifying liquid functional inks. As such, the fumed silica suspension should also have excellent UV transparency and thermal stability. Thus, the UV absorption of fumed silica suspensions at different concentrations was assessed using the UV/VIS spectroscopy. These results are illustrated in FIG. 6B. As seen from FIG. 6B, it was found that in the wavelength range from 250 to 1000 nm, both UV and visible light can easily get through the fumed silica bath. In particular, the UV absorption in the wavelength range of a typical UV curing system (from 350 to 500 nm) is almost negligible, as shown in the inset of FIG. 6B. In addition, there is no pronounced difference in UV absorption between fumed silica suspensions at different concentrations, which verifies that fumed silica suspensions are an excellent support bath material to print UV curable functional inks.

Figure 6C:
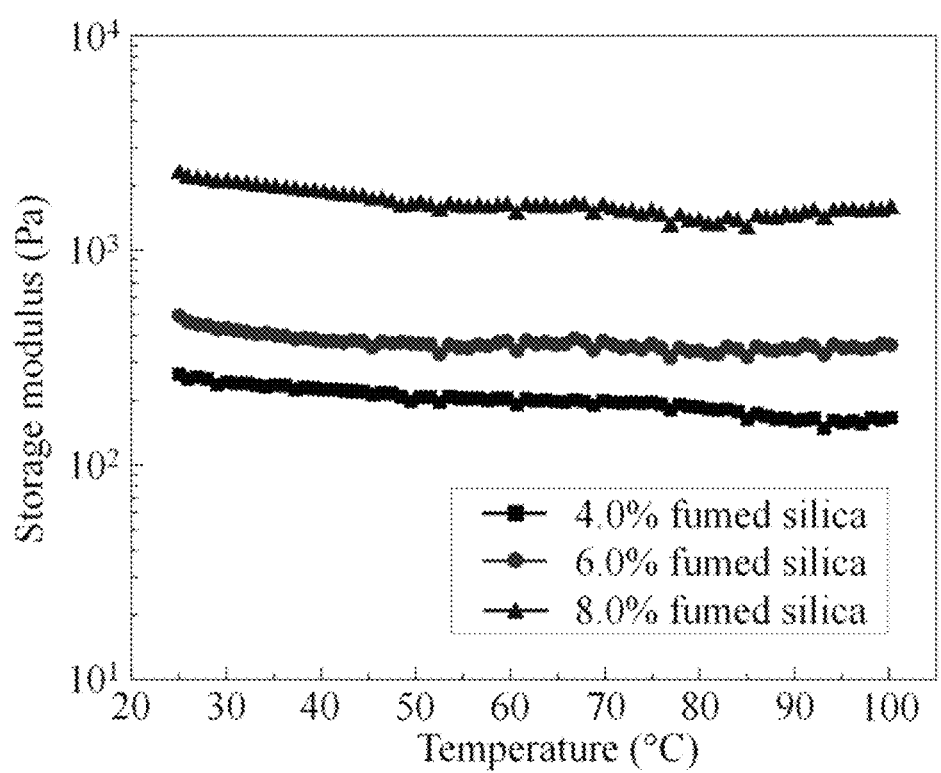
FIG. 6C illustrates graphically the relationship between storage moduli and temperature for yield-stress support baths having various fumed silica concentration.
Figure 8H:
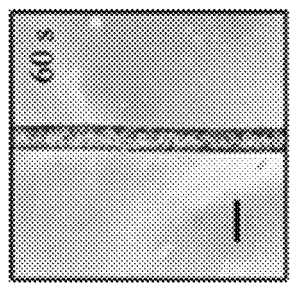
FIGS. 8G-8J illustrate a time-lapse image sequence of PDMS filament printed in a hydrophobic, shear-thinning fumed silica and mineral oil yield-stress support bath and the variation in morphology over a 24-hour period, where
Figure 8J:
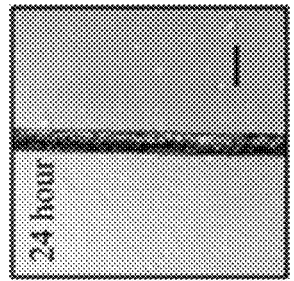
Figure 8G:
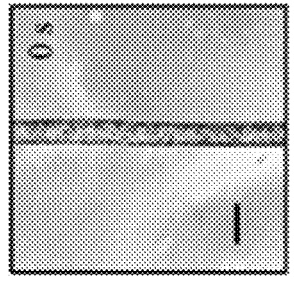
Figure 8I:
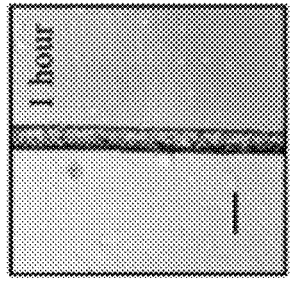
Figure 8F:
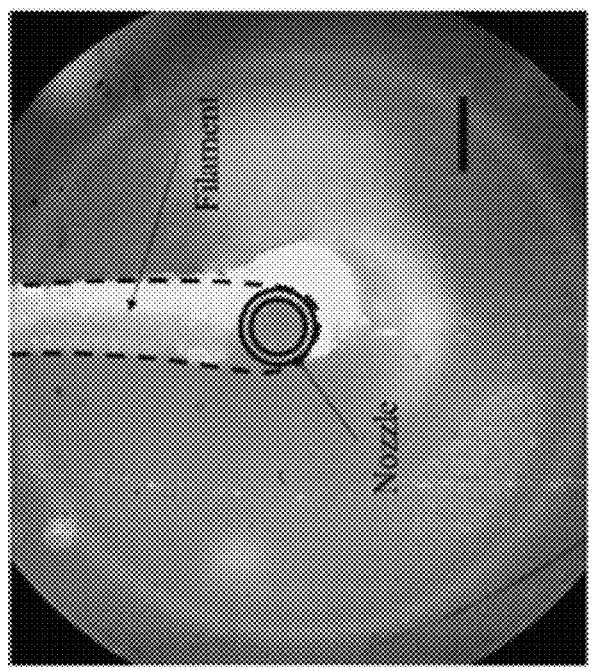
FIG. 8F is a bottom-view image of a functional ink being deposited into a fumed silica-containing yield-stress support bath, according to an embodiment.

After that, the storage moduli of fumed silica suspensions at different temperatures are measured to evaluate the thermal stability. The results are shown in FIG. 6C. As seen from FIG. 6C, it was found that by increasing the temperature from about room temperature (25° C.) to about 100° C., the storage moduli of fumed silica suspensions at different concentrations present negligible changes, which indicates that the solid-state 3D networked microstructures of fumed silica suspensions are not sensitive to the temperature change, resulting in the stable solid-like state of the suspensions at relative higher temperature, especially compared to previously reported hydrophobic support bath materials (micro-organogel). Thus, fumed silica suspensions can be used as a support bath material for 3D printing of thermally cross-linkable functional inks.

Referring now to FIGS. 7A-7C, after characterizing the material properties of fumed silica suspension, is the fumed silica suspension was used as the support bath for 3D printing applications. The mechanism of fumed silica suspension-assisted 3D printing approach is illustrated in FIG. 7A. When the nozzle moves in the fumed silica bath, the fumed silica aggregates around the nozzle tip experience a shear stress higher than the critical yield stress. Thus, these aggregates turn into an unjammed state and the suspension behaves like a liquid to entrap deposited features in the bath as well as to fill the crevasse behind the nozzle translation as shown in FIG. 7B. In contrast, the fumed silica aggregates far away from the nozzle tip remain in an unstressed condition, which allows the aggregates to recover to a jammed state, reassuming the 3D network structures as shown in FIG. 7C. As a result, the localized suspension behaves like a solid to stably hold the deposited features in situ for a long term without the localized suspension being cross-linked.

Referring now to FIGS. 8A-8J, hydrophobic printing material filaments dispensed within a yield-stress support bath are illustrated. Since continuous filaments are the basic unit that forms complex 3D structures during extrusion-based 3D printing, the filament formation in the fumed silica bath was investigated. PDMS, a hydrophobic elastomer which is transparent or substantially transparent at optical frequencies, exhibits low autofluorescence, and which is flexible while also being biocompatible, is contemplated for use in various fields including soft robotics, wearable sensors, and organ-on-a-chip applications. However, the viscosity of PDMS is relatively low and the cross-linking period is comparatively long (approximately a few hours depending on the ambient temperature). Thus, it can be challenging to 3D print PDMS structures using conventional 3D printing techniques. Instead, molding is the most commonly used method to make PDMS structures. Herein, PDMS is selected as an exemplary functional ink to print filaments in the fumed silica bath. The printing process is illustrated from a top view in FIG. 8A and from a bottom view in FIG. 8F. As illustrated, a continuous filament with a uniform diameter is easily deposited in the bath and stably held in situ due to the yield-stress property of the fumed silica suspension, as shown in FIG. 5A and FIG. 5B. In addition, no crevasse behind the nozzle translation can be observed due to the suspension's short transition time between liquid and solid as shown in FIG. 6A. Said otherwise, the liquid-like suspension fills the cavity formed behind the nozzle as it travels so that the deposited functional ink does not deform from the desired volume and form factor to fill the cavity.

Due to the hydrophobic property of PDMS, when PDMS is printed into an aqueous support bath, such as in printed continuous filaments, especially the filaments with small diameter, are easily broken up into droplets. For example, when printing a continuous PDMS filament (e.g., having a diameter of approximately 400 μm) in a Laponite RD bath, the continuous PDMS filament gradually breaks up into segments in about 2 minutes and finally breaks up into droplets in about 10 minutes, for instance due to the interfacial tension effect illustrated in the time lapse images of FIGS. 8B-8E, which were taken at 0 seconds, 60 seconds, 120 seconds, and 600 seconds, respectively. Increasing filament diameter is one strategy to help maintain the filament morphology, but this constrains the printing of small-scale PDMS structures in an aqueous support bath. In contrast, when printing in a fumed silica support bath, due to its hydrophobic properties, the interfacial tension between fumed silica suspension and liquid PDMS is comparatively low, which enables the PDMS filament (e.g., having a diameter of approximately 250 μm) to stably keep its original shape at liquid state (without solidification) for a relatively long time (e.g., about 24 hours) as shown in the time lapse images of FIGS. 8G-8J, which were taken at 0 seconds, 60 seconds, 1 hour, and 24 hours, respectively.

Figure 9A:
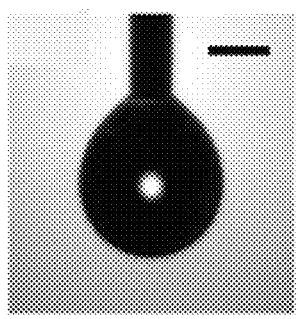
FIGS. 9A-9E illustrate an image sequence of droplet formation of water in air (FIG. 9A), PDMS in air (FIG. 9B), mineral oil in air (FIG. 9C), PDMS in water (FIG. 9D), and PDMS in mineral oil (FIG. 9E).
Figure 9B:
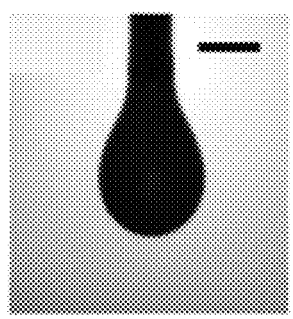
Figure 9C:
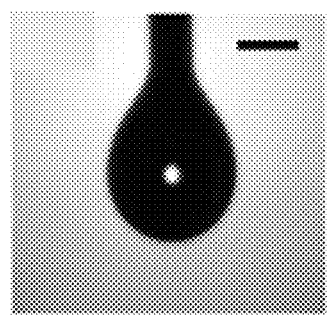
Figure 9D:
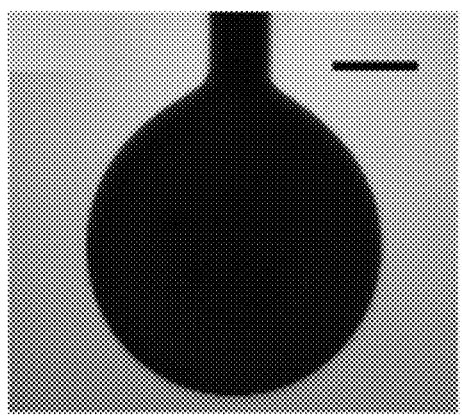
Figure 9E:
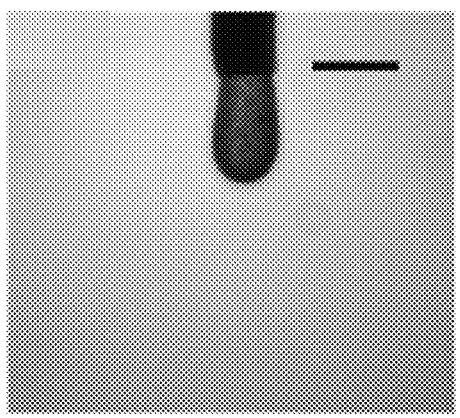
Figure 9F:
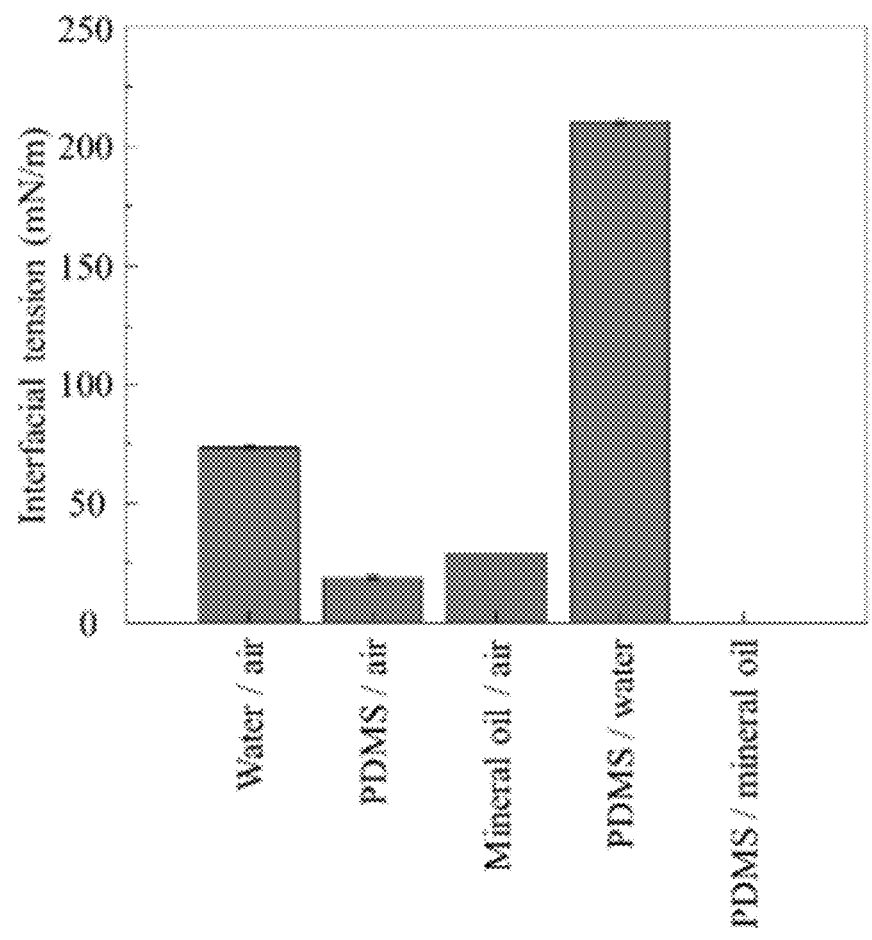
FIG. 9F is a graphical representation of the interfacial tension of the droplets of FIGS. 9A-9E.

To further explore the stability of continuous filaments in support bath materials, the interfacial tension between different solvents and liquid materials were measured, as shown in the images of FIGS. 9A-9E and the graphical representation of interfacial tension in FIG. 9F. FIG. 9A is an image of droplet formation of water in air. FIG. 9B is an image of droplet formation of PDMS in air. FIG. 9C is an image of droplet formation of mineral oil in air. FIG. 9D is an image of droplet formation of PDMS in water. FIG. 9E is an image of droplet formation of PDMS in mineral oil. As seen in FIGS. 9A-9F, the interfacial tension between PDMS and an aqueous solvent can be relatively high (e.g., about 42 mN/m), while the interfacial tension between PDMS and mineral oil can be almost negligible (e.g., about 0.21 mN/m). Based on the principle of Plateau-Rayleigh instability, the critical filament diameter (la) in a support bath is a function of interfacial tension ($\gamma$) and yield stress ($\tau_0$):

$$l_c = \frac{\gamma}{\tau_0}.$$

When the filament diameter is higher than this critical value, the deposited filament can maintain its morphology, otherwise it can break up into droplets under the interfacial tension effect. As a result, in aqueous support baths such as Laponite RD, the critical filament diameter is relatively large due to the high interfacial tension, while in fumed silica bath, PDMS filaments can have small diameters. As a result, the formed filaments are more stable and the intermediate and finished articles can have greater complexity.

Figure 10A:
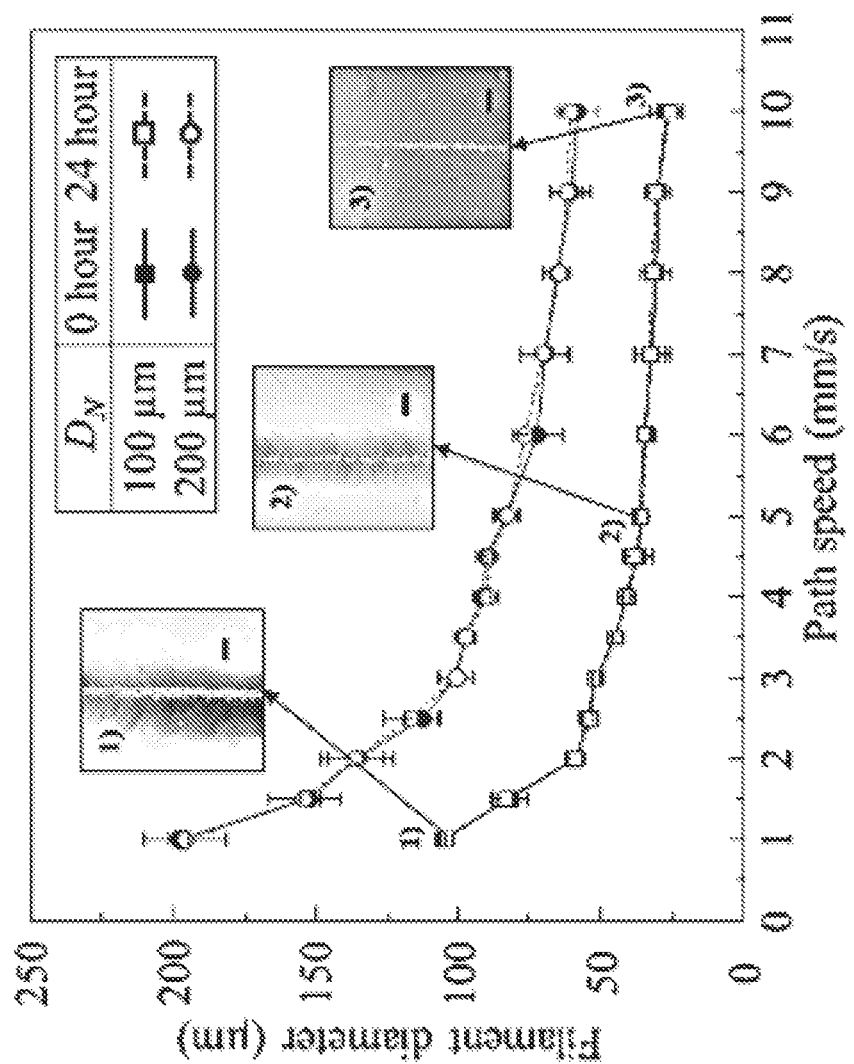
FIG. 10A is a graphical representation of achievable minimum PDMS filaments in a 6.0% (w/v) fumed silica yield-stress support bath.
Figure 10B:
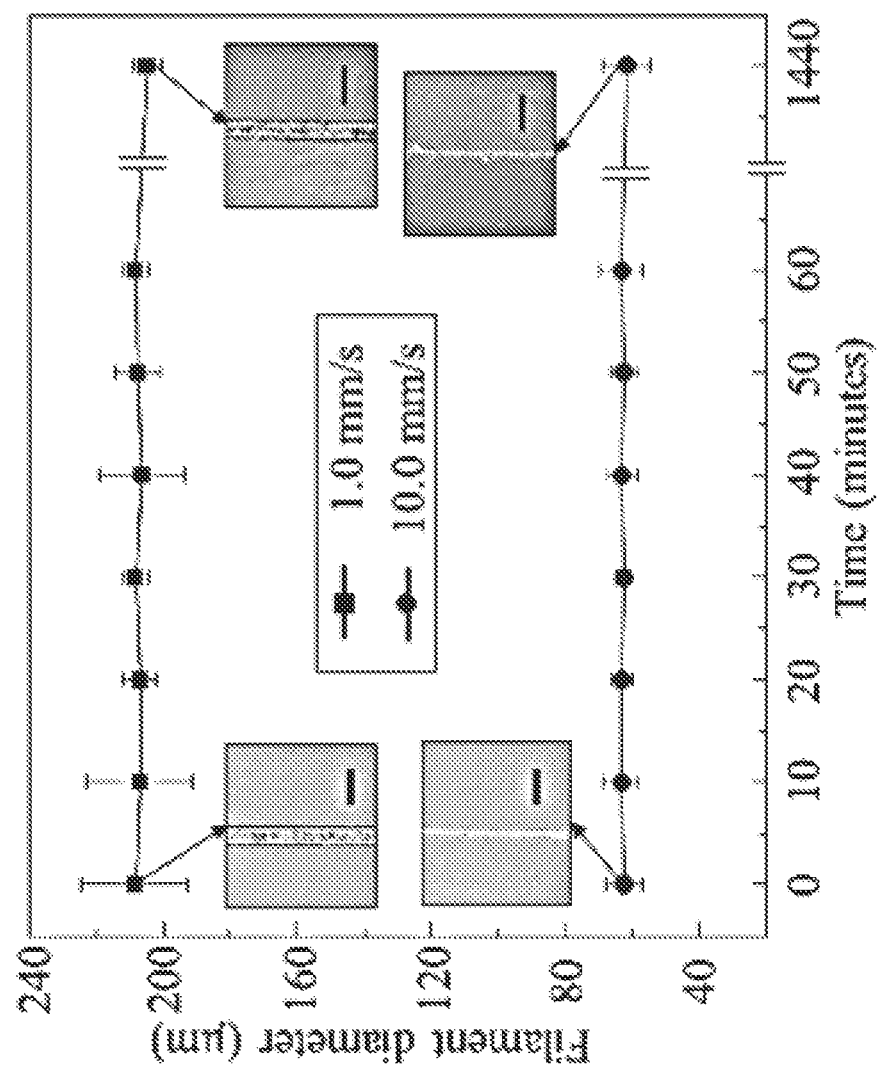
FIG. 10B is a graphical representation of PDMS filament stability in a 4.0% (w/v) fumed silica yield-stress support bath.
Figure 10C:
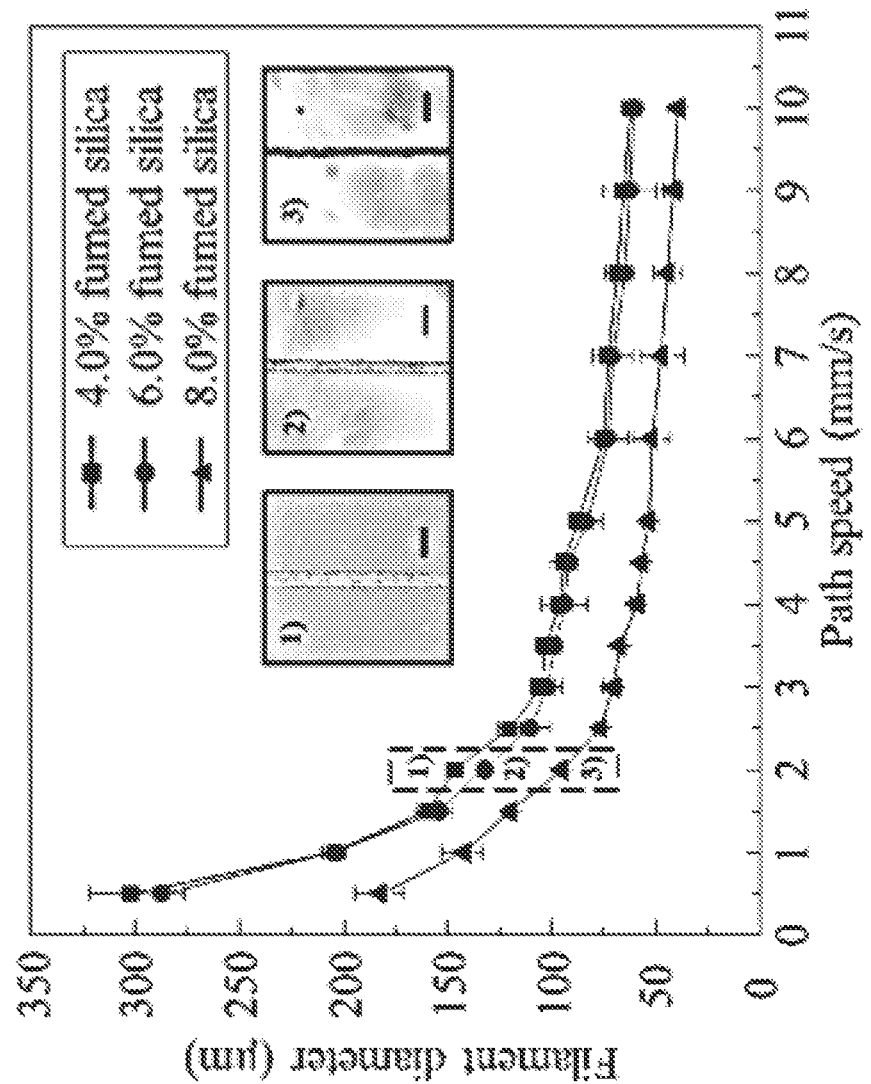
FIG. 10C is a graphical representation of filament diameter as a function of path speed for yield-stress support baths having various fumed silica concentrations.

Referring now to FIGS. 10A-10C, the achievable minimum PDMS filament diameter, stability of PDMS filaments in the fumed silica-containing yield-stress support bath, and filament diameter as a function of path speed (the speed at which filaments are dispensed within the yield-stress support bath) are presented. For instance, a PDMS base agent was printed in a 6.0% (w/v) fumed silica bath with two dispensing tips (a 32 gauge (100 μm inner diameter) dispending tip and a 27 gauge (200 μm inner diameter) dispensing tip) in the path speed range of 1.0 mm/s to 10.0 mm/s. The filament diameter was measured immediately after printing and 24 hours after printing, as shown in FIG. 10A. To further investigate the stability of filaments in the fumed silica bath, a 27 gauge (200 μm inner diameter) dispensing tip was used to print PDMS base agent in a 4.0% (w/v) fumed silica suspension at path speeds of 1.0 mm/s and 10.0 mm/s, respectively. The filament diameter was measured again after 24 hours, as shown in FIG. 10B. From FIG. 10A and FIG. 10B, it is shown that the PDMS filaments in different printing conditions all stably maintain the original morphology in the fumed silica baths. Thus, it is feasible to print small-scale PDMS structures using the fumed silica suspension-assisted 3D printing technique.

In extrusion-based 3D printing, filament diameter is affected both by operating conditions, such as dispensing pressure, nozzle diameter, and path speed, as well as material rheological properties. Because these operating conditions affect the printing of continuous filaments with various diameters, the effects of path speed and bath material concentration on filament size was investigated. It is noted that, when the other operating conditions are given, the relationship between filament diameter ($D_f$) and path speed ($v_{path}$) meets the following mathematical model due to the constant volume flow rate (Q) and conservation of mass:

$$D_f = \sqrt{\frac{4Q}{\pi v_{path}}}.$$

Thus, with the increase of path speed, the filament diameter decreases significantly first and then reduces slightly, as shown in FIG. 10C. In addition, the concentration of the fumed silica bath can also affect filament diameter. With the increase of fumed silica concentration, the storage modulus in the support bath also increases, as shown in FIG. 5B, which makes the deposited liquid filaments undergo more compression stress in the supporting bath, resulting in the decrease of filament diameter.

Referring now to FIGS. 11A-11F, inter-filament fusion characteristics for particular embodiments are illustrated in more detail. In addition to filament diameter and morphology, the fusion between adjacent filaments is another technical issue in extrusion-based 3D printing, which may significantly affect the surface roughness, dimensions and mechanical properties of printed structures. Since fumed silica suspension-assisted 3D printing of functional inks also follows the "printing-then-solidification" procedure, in which printed 3D structures do not undergo solidification until the printing process is finished, the adjacent filaments can fuse well with each other in the liquid state, resulting in mechanical properties of printed structures similar to cast ones. Thus, the effects of step distance on the sheet thickness and roughness were studied. For example, FIG. 11A illustrates the relationship between sheet thickness and step distance. Herein, the PDMS filaments with uniform diameter (D) of about 200 µm are deposited in the fumed silica bath and the step distance (d), distance between adjacent filaments, is increased from about 100 µm to about 225 µm with an interval of about 25 µm, as shown in FIG. 11A, section (a-1). As seen from FIG. 11A, due to the conservation of volume, the resulting sheet thickness (t) linearly decreases with the step distance/filament diameter ratio (d/D). In addition, when this step distance/filament diameter ratio is smaller than about 1.0, the printed sheets have a uniform surface (as shown in FIG. 11A, section (a-2)) with a sheet thickness higher than the filament diameter (e.g., about 200 µm), otherwise some gaps between adjacent filaments can be observed as shown in FIG. 11A, section (a-3) and the sheet thickness is closed to the filament diameter.

The surface roughness of the sheets with various step distances was measured. The cross sections of the printed sheets were imaged using an optical microscope, as shown in FIG. 11B. The midline between the peak points and valley points is marked and 21 points with an equal interval distance are selected, as shown in FIG. 11B. Thus, the distance between each selected point and midline ($|Z_i|$) is measured and the average value of the measured distances (Ra) is calculated by $$R_a = \frac{\sum_{1}^{21}|Z_i|}{n},$$

which was used to evaluate the surface roughness of the printed sheets. The relationship between the surface roughness and the step distance is illustrated in FIG. 11C. FIG. 11B and FIG. 11C illustrate that the surface roughness of PDMS sheets with the step distances between about 125 µm and about 175 µm presents no pronounced variance. In contrast, when the step distance is close to the filament diameter (e.g., about 200 µm), the surface roughness increases. Without wishing to be bound by any particular theory, this may be because, in fumed silica suspensions, each deposited filament is stably held in situ and maintains at liquid state, as illustrated in FIG. 11D. Thus, the subsequently deposited filament can easily fuse well with the previously deposited filament and flatten the overlap region, resulting in a relatively smooth surface and a thickness greater than (or higher than) a filament diameter, as shown in FIG. 11F. However, when the step distance is close to the filament diameter, the overlap region between adjacent filaments can sometimes be too small to flatten the gaps generated between two deposited filaments, as illustrated in FIG. 11E, which may lead to the increase of surface roughness and a sheet thickness close to the filament diameter.

Referring now to FIGS. 12A-12H, particular embodiments of PDMS structures printed in fumed silica bath are illustrated in more detail. In particular, more complex PDMS structures can be additively manufactured in the fumed silica yield-stress support bath. First, a PDMS fluidic chip with micro scale channels was printed in a fumed silica bath. The schematic of the printing process is illustrated in FIG. 12A. In some particular embodiments, a PDMS base agent was mixed with a curing agent at the given ratio and loaded into the dispensing nozzle to print the fluidic microchip layer by layer. In some embodiments, after mixing with the curing agent, the PDMS base agent can start to cross-link gradually, as shown in FIG. 12B, and the entire solidification period may take around 24 hours at room temperature. To improve the fabrication efficiency, the ambient temperature of the fumed silica bath can be increased to, for instance, approximately 80° C. At relatively elevated temperatures, the printed PDMS structures may substantially or completely cross-link, e.g., in less than about 40 minutes, according to some embodiments. Due to the thermal stability at higher temperature, as shown in FIG. 6C, the fumed silica bath may still maintain its yield-stress property and may stably hold the cross-linking PDMS structures in situ before the solidification process is finished.

The designed chip (e.g., having dimensions of about 12.0 mm×about 12.0 mm×about 2.4 mm) can have a continuous channel on the surface with a depth of about 0.9 mm and a width of about 0.5 mm, as shown in FIG. 12C. After heating the fumed silica bath at about 80° C., the PDMS microchip was substantially or completely cross-linked and was easily removed from the bath. After cleaning the residual fumed silica suspensions on the surface and in the channel, an oil-based dye was used to visualize the profile of the printed channel, as shown in FIG. 12D. FIG. 12E illustrates the top view of the micro channel, which was imaged by an optical microscope. As shown in FIG. 12D and FIG. 12E, the printed channel had a well-defined shape with clear boundaries.

In addition to micro-scale structures, fumed silica suspensions can also be used as a support bath to facilitate 3D printing of large-scale structures. Herein, a PDMS octopus-like structure was designed (as shown in FIG. 12F) which has overall dimensions of about 42.0 mm×about 42.0 mm×about 32.0 mm. Due to the existence of many overhanging sections, such an irregular PDMS structure would be difficult to fabricate by conventional molding and casting approaches. However, with the help of a fumed silica bath, PDMS functional ink can be deposited (printed) into the fumed silica bath so as to have the dimensions and form factor of the octopus-like structure shown in FIG. 12G and FIG. 12H, forming an intermediate article that can be cross-linked to form the finished article.

Figure 13E:
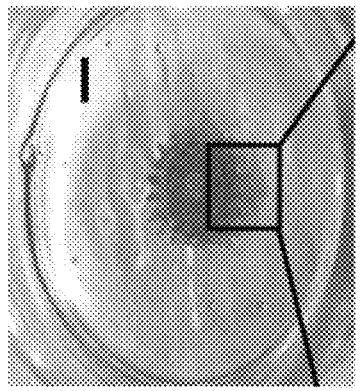
FIG. 13E is an image of the cross-linked SU-8 gear structure from FIG. 13D in the yield-stress support bath of FIG. 1B.
Figures 13G, 13H:
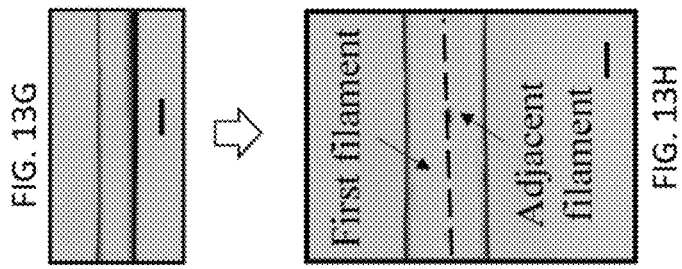
FIG. 13G is a microscope image of a printed filament in a yield-stress support bath.
FIG. 13H is a microscopic image of a second filament dispensed adjacent to the first filament from FIG. 13G.
Figure 13D:
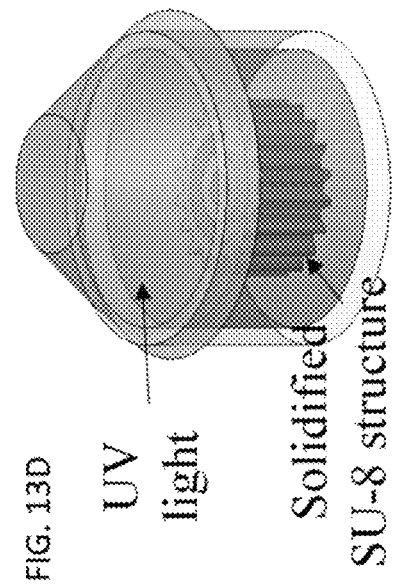
FIG. 13D is a schematic illustration of the SU-8 gear structure of FIG. 13A, cross-linked by UV radiation to solidify the printed structure to the finished part.
Figure 13F:
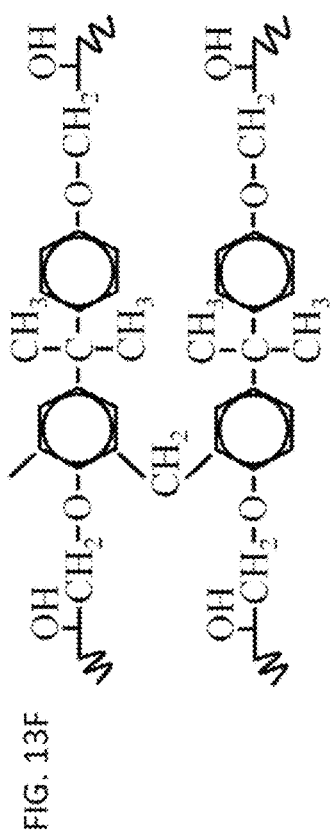
FIG. 13F is a chemical structure of the SU-8 monomer of FIG. 13C, cross-linked to form a polymeric structure.

Referring now to FIGS. 13A-13M, a fumed silica suspension can be utilized to print UV curable functional inks due to its excellent UV transparency. As illustrated herein, SU-8, a negative photoresist, is selected as an exemplary ink material to be printed in the fumed silica support bath. In some embodiments, SU-8 can comprise a bisphenol A novolac epoxy that is dissolved in an organic solvent (e.g., gamma-butyrolactone (GBL) or cyclopentanone, depending on the formulation) and up to about 10 wt % of mixed triarylsulfonium/hexafluoroantimonate salt as the photoacid generator). Due to its high chemical and thermal resistances as well as good mechanical properties, SU-8 can be widely used in various fields including microelectromechanical systems (MEMS) and microfluidic systems, to name a few. However, due to the relatively long UV cross-linking time, a photomask-assisted polymerization approach is the most commonly used technique to fabricate SU-8 structures. 3D printing of SU-8 structures can be carried out in a hydrophilic support bath (Laponite suspension), however, due to interfacial tension, the deposited filaments usually have a relatively larger diameter, resulting in printed structures with lower resolution (less granularity). Thus, it is still a challenge to 3D print high-resolution complex structures with SU-8. Using the fumed silica suspension as the support bath, a printed SU-8 structure can maintain its geometry in a liquid phase during printing, as shown in FIG. 13A. After printing, UV radiation was used to solidify the SU-8 structure in the support bath, which makes the epoxide monomers of SU-8 transform from a low-molecular weight melt to a highly cross-linked network as shown in FIG. 13D.

To illustrate the effectiveness of fumed silica suspension in SU-8 functional ink printing, a SU-8 filament was printed in a fumed silica bath. The printed filament was kept in the bath for about one hour without undergoing UV radiation and then imaged under a microscope, as shown in FIG. 13G. FIG. 13G illustrates that the printed SU-8 filament does not break up into droplets in the observation window and presents a well-defined shape with clear boundaries. Then, another SU-8 filament was deposited close to the previously deposited SU-8 filament, demonstrating that adjacent SU-8 filaments can fuse well with each other in fumed silica baths, as shown in FIG. 13H.

Figures 13L, 13M:
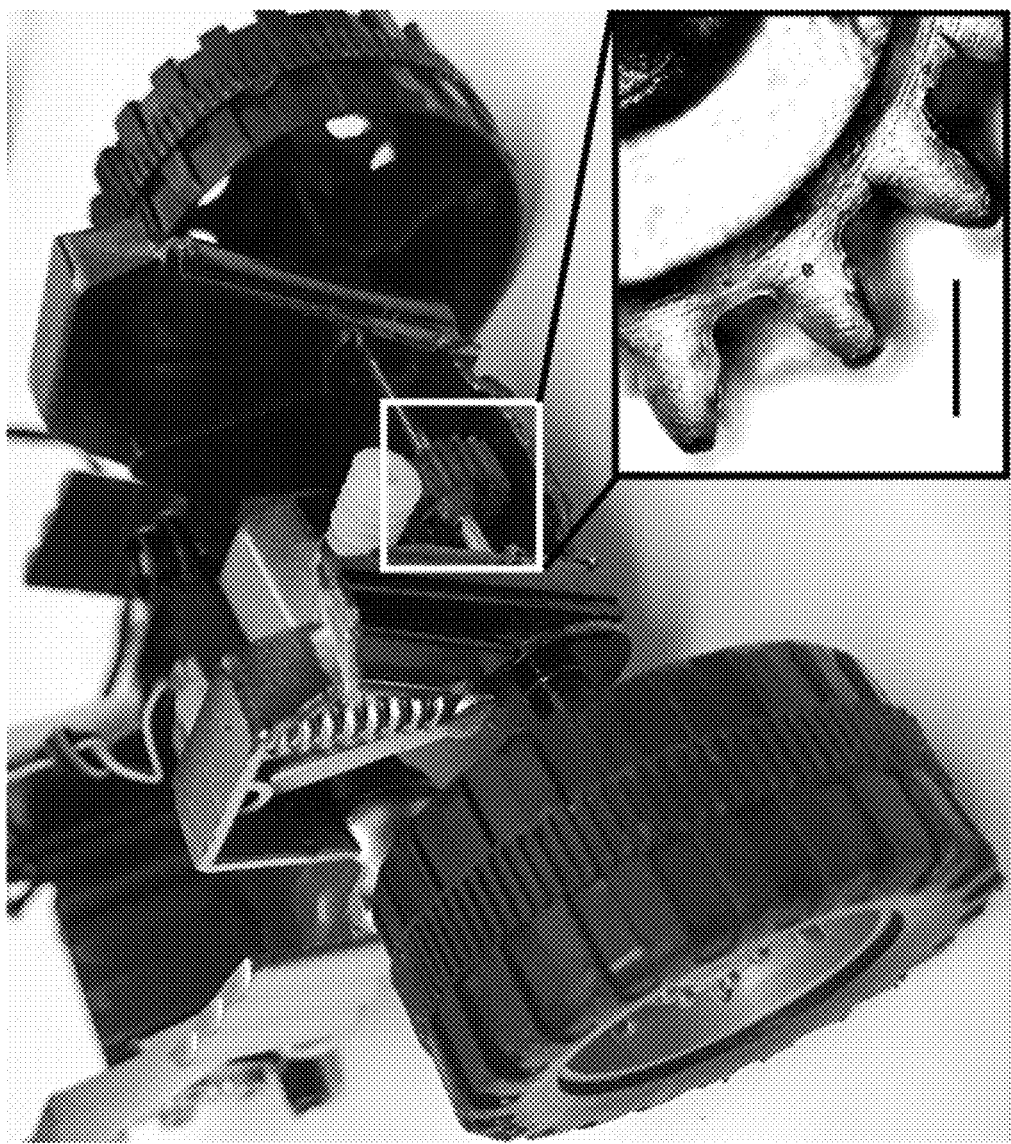
FIG. 13L is an image of the 3D printed, cross-linked SU-8 gear from FIG. 13D dispensed about an axle of the robotic vehicle of FIG. 13I.
FIG. 13M is a close-up view, from an axial direction, of the 3D printed, cross-linked SU-8 gear from FIG. 13L.

Then a gear was designed, as shown in FIG. 13J, and printed using a SU-8-containing ink in a fumed silica bath, as shown in FIG. 13K. After printing, the SU-8 gear was exposed to UV radiation for about 15 minutes to cross-link the SU-8 ink solution and the cross-linked gear was further solidified in an oven at a temperature of about 90° C. for about 30 minutes, as shown in FIG. 13E. After that, the solidified SU-8 gear was collected from the fumed silica bath and the residual fumed silica suspension was removed, as shown FIG. 13K. Finally, the gear was assembled with an axle connecting two wheels, as shown in FIG. 13I. Testing of the printed SU-8 gear was performed by driving a gear-fixed motor for ten speed-up-and-down circles, as shown in FIG. 13L. After testing, the gear was disassembled from the axle and imaged using a microscope to check the integration, as shown in FIG. 13M. FIG. 13M illustrates that there was no pronounced deformation and/or cracking of the SU-8 gear after testing with the gear-fixed motor. Without wishing to be bound by any particular theory, this may be because, at liquid state, each deposited SU-8 filaments can fuse well with adjacent SU-8 filaments to improve the interfacial strength, resulting in the entire 3D printed structure exhibiting excellent mechanical stiffness and durability.

Figures 14A, 14B, 14C:
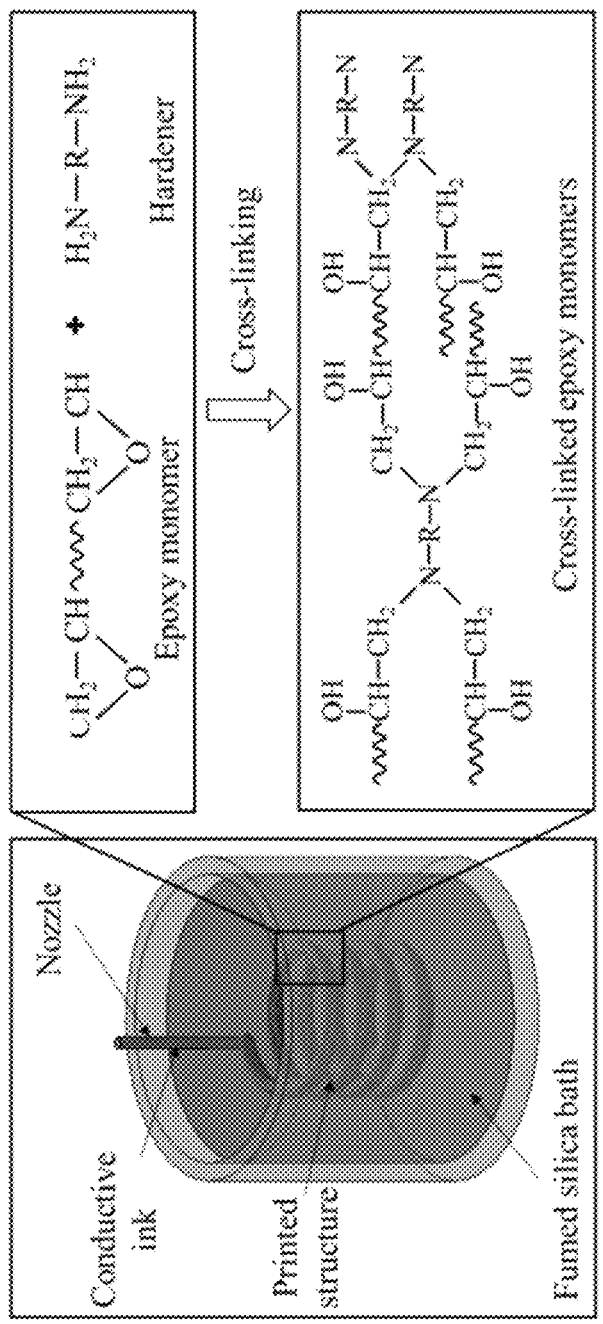
FIG. 14A is a schematic illustration of a process and system for 3D printing of conductive ink in a fumed silica-containing yield-stress support bath, according to an embodiment.
FIG. 14B is a chemical formula illustration of a hydrophobic epoxy-based conductive material and a hardener for 3D printing of conductive ink into the fumed silica-containing yield-stress support bath of FIG. 14A.
FIG. 14C is a chemical formula illustration of the printed and cross-linked conductive ink once the epoxy monomers of FIG. 14B are cross-linked, thereby forming a polymeric structure.

Referring now to FIGS. 14A-14K, conductive, hydrophobic ink materials were also used to print articles in fumed silica-containing yield-stress support baths. Along with PDMS and SU-8, epoxy-based conductive inks were also contemplated herein for use as functional inks, e.g., for use in electronic fields. Herein, a silver-based conductive ink was used as an example for printing electronic components in a fumed silica bath. The schematic of the printing process is illustrated in FIG. 14A. After mixing the epoxy-based conductive ink (see, e.g., FIG. 14B) with a hardener (see, e.g., FIG. 14B), the cross-linking process occurred, and the epoxy monomers gradually connected with each other to form a stable 3D molecular network, as shown in FIG. 14C.

Figure 14H:
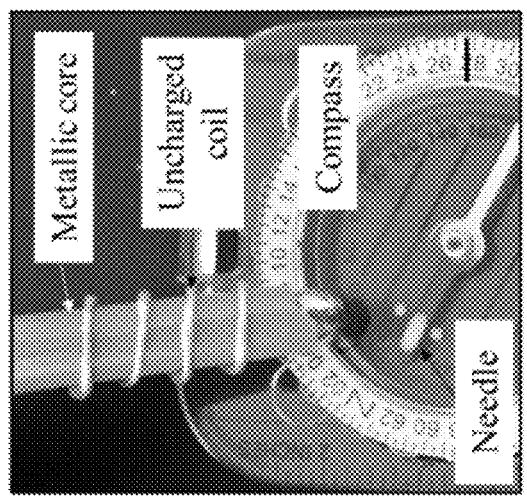
FIG. 14H is an image of the 3D printed inductor of FIG. 14F in which the inductor is uncharged.
Figure 14G:
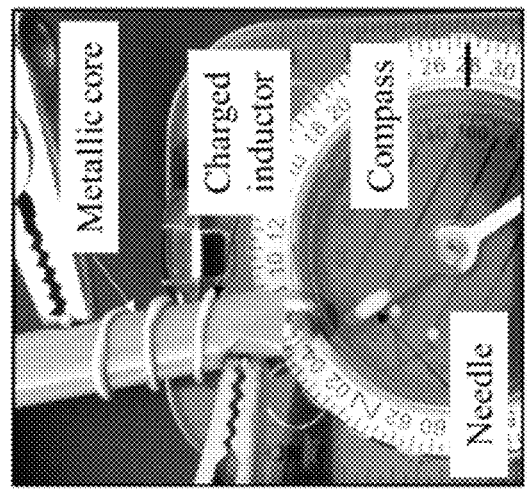
FIG. 14G is an image of the 3D printed inductor of FIG. 14F in which the inductor is charged.
Figure 14E:
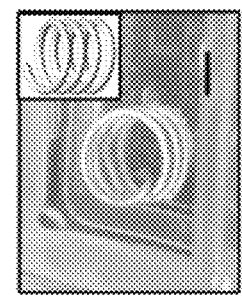
FIG. 14E is a schematic illustration of a 3D printed inductor, according to an embodiment.
Figure 14F:
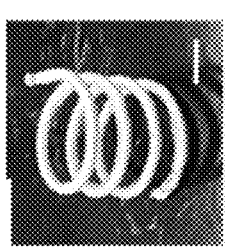
FIG. 14F is an image of a 3D printed inductor printed according to the schematic illustration of FIG. 14E.
Figure 14D:
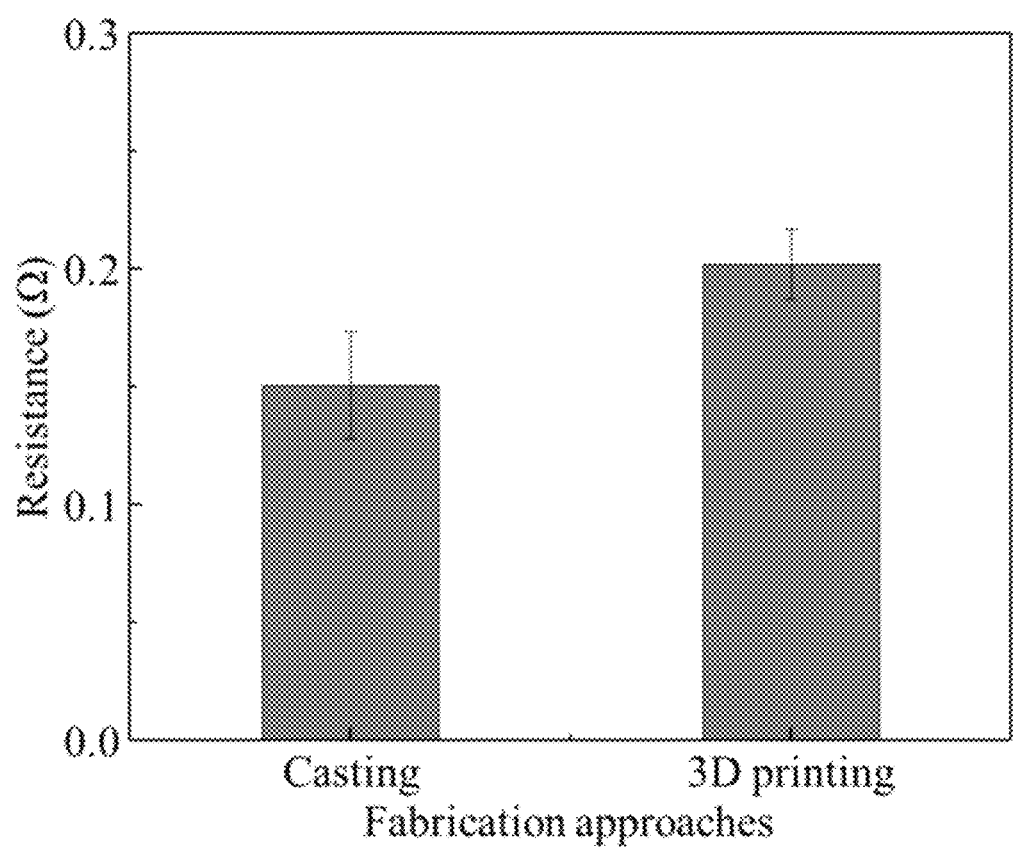
FIG. 14D is a graphical representation of resistance for a cast article as opposed to an article 3D printed according to the process and system of FIG. 14A.

It is noted that, in the fumed silica bath, the conductive ink cross-linking process may take approximately 10 days at room temperature. Thus, each deposited liquid conductive filament has enough time to fuse well with adjacent ones. To investigate the effects of fabrication approach on resistance, rectangular-shaped samples were fabricated by both printing and casting. After cross-linking in the fumed silica suspension per the same protocol, the resistances are measured, as shown in FIG. 14D. FIG. 14D illustrates that the measured resistance of cast samples is close to that of printed samples. The slightly higher resistance of 3D printed samples may be attributed to defects during printing, such as bubbles and residual fumed silica suspension entrapped between adjacent layers.

Figure 14J:
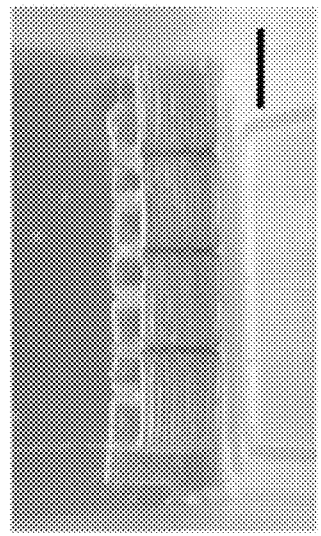
FIG. 14J is an image of a 3D printed battery set printed according to the schematic illustration of FIG. 14I.
Figure 14K:
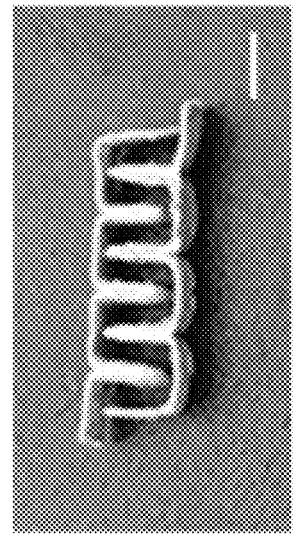
FIG. 14K is a top-view image of the 3D printed battery set printed according to the schematic illustration of FIG. 14I.
Figure 14I:
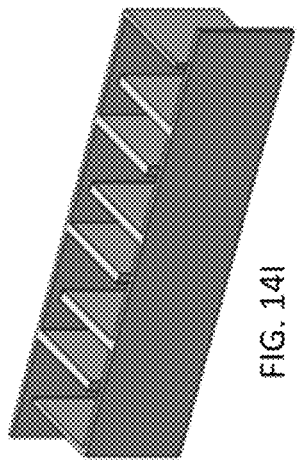
FIG. 14I is a schematic illustration of a 3D printed battery set, according to an embodiment.

Some electronic components are 3D printed in the fumed silica bath. In some embodiments, an inductor is designed, as shown in the inset of FIG. 14E, and printed at liquid state in the fumed silica bath (see, e.g., FIG. 14E). After keeping the cast/printed part in the bath for 10 days, the inductor was solidified and collected from the bath. Then, the residual fumed silica suspensions were rinsed from the surface. The solid fumed silica-free inductor, illustrated in FIG. 14F, can be used as a solenoid according to some embodiments. As shown in FIG. 14G, the charged inductor can generate a magnetic field to move the needle of a compass. When the electric current is turned off, the magnetic field disappears and the needle moves back to the original position, as shown in FIG. 14H. Such solenoids can be further utilized to make some complex devices such as transducers, relays, and solenoid valves. In addition to inductors, other complicated 3D structures, such as a battery set as shown in FIG. 14I, can also be printed in the fumed silica suspension, as shown in FIG. 14J. A fumed-silica free structure printed and solidified/cured according to one embodiment of the solidification and post-treatment protocol is illustrated in FIG. 14K. The dimensions of the designed and fabricated electronic components at different measurement windows (e.g., including immediately after printing, about 10-days after printing, and after residual fumed silica rinsing) were measured. It was found that the sizes of the electronic components on day 10 are slightly larger than those on day 0, which may be explained by the slow diffusion of epoxy monomers into the fumed silica bath, resulting in the swollen profiles measured in the bath. However, during rinsing, these un-cross-linked conductive monomers may be removed with the residual fumed silica suspensions on the surface of the electronic components, leading to a decrease of the measured dimensions.

In summary, fumed silica/mineral oil suspensions are described herein for use as versatile support baths to facilitate 3D printing of various functional inks, such as hydrophobic inks. Due to the hydrophobic property of such a support bath, the interfacial tension between bath material and ink materials may be smaller, e.g., much smaller, than that in aqueous solvent-based support baths, which makes it feasible for printing small-scale and/or complex structures with hydrophobic functional inks. In addition, the excellent UV transparency and thermal stability of fumed silica suspension enables it to be used as the support bath for thermal cross-linking and/or UV curable functional ink printing. To verify the diversity of the proposed support bath material, three functional inks including PDMS, SU-8, and epoxy-based conductive ink were used to fabricate several complex 3D structures using the fumed silica suspension-assisted 3D printing technique, however other bath and ink compositions as well as printing and curing methodologies are also contemplated.

According to some embodiments, for the proposed printing methodology to be feasible, a structure being printed should remain liquid or partially liquid to avoid filament/layer interfaces and nozzle clogging. in some embodiments, the printing of a liquid structure is accomplished by using a yield-stress support bath in which build material is extrusion printed. In general, support bath materials suitable for 3D printing are thixotropic yield-stress materials which are also compatible with the solidification/gelation of the printed material. Yield-stress materials may behave as solids at rest but as liquids when a sufficient shear stress is applied; after the stress is removed, they may also promptly revert to the solid-like state. Thus, a rigid printing nozzle can easily be inserted into a bulk yield-stress support bath. As it travels, it locally liquefies the support bath material to allow ink deposition; extruded fluid build material is then trapped as the support bath material reverts to the solid-like state when the nozzle travels away. The build material is trapped in a 3D configuration defined by the nozzle's travel path and retains its shape even though the build material is still fluid. An entire 3D fluid intermediate part can be formed in this way, the entire intermediate part remaining substantially liquid/fluid until cured. Then, some stimulus (e.g., heat, chemical, UV radiation, etc.) can be applied which causes solidification of the fluid build material so that it can form the finished article and the finished article can be separated from the support bath as an intact part.

Provided below are examples and experimental details of a method for freeform 3D printing of various hydrophobic articles according to the methods 10 and 20 described hereinabove.

SPECIFIC EXAMPLES

Fumed silica suspension preparation. Commercial hydrophobic fumed silica Aerosil@R812 (Evonik, Parsippany, NJ) was used as the support bath material for various hydrophobic functional ink printing. Fumed silica suspensions were prepared by dispersing the appropriate amount of dry fumed silica powder in mineral oil (light, Sigma-Aldrich, St. Louis, MO) at room temperature. After continuous mixing for 90 min using an overhead stirrer (Thermo Fisher Scientific, Waltham, MA) at 500 rpm, the fumed silica suspensions were aged for at least one day. Before each use, the fumed silica suspensions were centrifuged using a centrifuge (5804R, Eppendorf, Hamburg, Germany) at 3,000 rpm for 10 min to completely remove bubbles trapped in the suspensions. Specifically, 4.0% (w/v), 6.0% (w/v), and 8.0% (w/v) fumed silica suspensions were used to characterize the rheological properties, UV transparency, and thermal stability of the suspensions. For various functional ink printing studies, 6.0% (w/v) fumed silica was used as the support bath.

Hydrophobic functional ink preparation. The PDMS (Sylgard 184, Dow Corning, Midland, MI) ink was prepared by mixing the base agent with the curing agent using a glass rod at the volume ratio of 5:1 for 5 minutes. Before printing, PDMS ink was degassed using the centrifuge at 1500 rpm for 5 minutes to remove entrapped bubbles. The photosensitive SU-8 2050 (MicroChem, Westborough, MA), having a viscosity of 12,900 cP, was used as received to fabricate SU-8 structures. The commercial epoxy-based conductive ink (H22 EPO-TEK, TED PELLA, Redding, CA) was prepared by mixing the base agent with the hardener using a glass rod at the weight ratio of 100:4.5 per the manufacturer's protocol and degassed using the centrifuge at 1500 rpm for 5 minutes to remove entrapped bubbles.

Characterization of fumed silica suspensions. Micro- and nano-scale structures of fumed silica suspensions were observed using both a scanning electron microscope (SEM) (SU5000 FE-VP SEM, Hitachi High Technologies America, Schaumburg, IL) and a transmission electron microscope (TEM) (Hitachi H7000 TEM, Hitachi High Technologies America, Schaumburg, IL). The fumed silica samples for SEM and/or TEM imaging were prepared by diluting 6.0% (w/v) fumed silica suspensions with 100% EtOH at the volume ratio of 1:1. Then the diluted fumed silica suspensions were sputter coated onto a plastic coverslip which was mounted onto a 25 mm carbon tab/25 mm stub for imaging. The SEM was operated at 5-10 kV and the TEM was operated at 100 kV.

Rheological properties of the fumed silica suspensions at different concentrations were measured using a rheometer (Anton Paar MCR 102, Ashland, VA) with a parallel plate measuring geometry (a diameter of 25.0 mm and a plate-to-plate gap distance of 1.0 mm). Steady shear rate sweeps were performed by varying the shear rate from 0.01 to 500 $s^{-1}$ to determine the yield stress of the fumed silica suspensions. Frequency sweeps (frequency range: 0.05~10 Hz) were performed at a low strain of 1.0% for the fumed silica suspensions to explore the degree of fluid-like behavior. During transient step shear rate tests which were used to evaluate the thixotropic response time of the bath materials, fumed silica suspensions at different concentrations were pre-sheared at the shear rate of 10 $s^{-1}$ for 120 seconds at the beginning and then the shear rate was decreased to 0.01 $s^{-1}$. The viscosity variation was recorded during the subsequent 300 seconds.

The UV/Vis transparency of fumed silica suspensions at different concentrations were measured using a UV/Vis spectrophotometer (UV-1800, Shimadzu, Tokyo, Japan). The UV/visible light wavelength was swept from 200 nm to 1000 nm and the absorption of the light density passing through the fumed silica suspensions were recorded.

The thermal stability of the fumed silica suspensions was investigated using a rheometer (Anton Paar MCR 92, Ashland, VA) with a cone-plate measuring geometry (a diameter of 50 mm, a cone-to-plate gap distance of 100 µm, and a cone angle of 1.00°). Temperature sweeps were performed at a low strain of 1.0% for the fumed silica suspensions at different concentrations. The temperature was increased from 25° C. to 100° C. with the increasing rate of 1° C./10 s and the storage modulus at each temperature was measured.

Printing system and printing protocols. The extrusion system was a micro-dispensing pump machine (nScrypt-3D-450, nScrypt, Orlando, FL) and all the functional inks were printed in the 6.0% (w/v) fumed silica bath at room temperature. For PDMS printing, a 30 gauge (150 µm inner diameter and 12.70 mm length) dispensing tip (EFD Nordson, Vilters, Switzerland) and a 25 gauge (250 µm inner diameter and 25.40 mm length) dispensing tip (EFD Nordson, Vilters, Switzerland) were used to print microchips and octopus-like structures in fumed silica support bath, respectively. The step distances were set as 200 µm and 250 µm, and the printing pressures were $1.38 \times 10^5$ Pa (20 psi) and $1.73 \times 10^5$ Pa (25 psi), respectively. The path speed for microchip printing was 1.00 mm/s and that for octopus printing was 3.00 mm/s. After printing, the fumed silica baths containing the printed PDMS structures were heated to 80° C. for 40 minutes to solidify the structures, which were then harvested from the baths. For SU-8 printing, a 27 gauge (200 µm inner diameter and 12.7 mm length) dispensing tip (EFD Nordson, Vilters, Switzerland) was used to print SU-8 structures in the fumed silica bath with a step distance of 150 µm. The dispensing pressure was $2.06 \times 10^5$ Pa (30 psi) and the path speed was 0.50 mm/s. After printing, the deposited structure in the bath was exposed to UV light for 15 minutes for cross-linking and then baked at 90° C. for 30 minutes for the complete curing of SU-8. For conductive ink printing, a 25 gauge (250 µm inner diameter and 12.70 mm length) dispensing tip (EFD Nordson, Vilters, Switzerland) was used to print different electronic components in the fumed silica bath with a step distance of 200 µm. Specifically, the dispensing pressure for battery and inductor printing was $1.73 \times 10^5$ Pa (25 psi) and that for resistor printing was $2.06 \times 10^5$ Pa (30 psi). The path speeds for battery, inductor and resistor printing were 1.25 mm/s, 1.00 mm/s, and 1.50 mm/s, respectively. After printing, the electronic components were kept in the bath for 10 days at room temperature for cross-linking.

Digital 3D models for the various printing applications herein were designed using SolidWorks (Dassault Systemes SolidWorks Corp., Waltham, MA), and the corresponding STL files were sliced by Slic3r (http://slic3r.ort) to generate the G-codes for 3D printing.

Observation and analysis of printed filaments/sheets. To observe filament printing process, a 20 gauge (610 µm inner diameter and 38.10 mm length) dispensing tip (EFD Nordson, Vilters, Switzerland) was used to deposit PDMS base agent mixed with a scarlet powdered pigment (Pearl Ex, Jacquard, Healdsburg, CA) in the 6.0% (w/v) fumed silica bath with the path speed of 2.00 mm/s and the printing pressure of $1.03 \times 10^5$ Pa (15 psi). Images and videos from the bottom and side views were captured using a high speed camera (Fastcam SA5, Photron, San Diego, CA) with the frame rate of 250 fps (frame per second). To investigate the effects of path speed and support bath on the filament diameter, PDMS base agent mixed with the scarlet color dye was printed in 4.0%, 6.0%, and 8.0% (w/v) fumed silica suspensions respectively with the increasing path speed from 0.5 mm/s to 10.0 mm/s and the morphology of the deposited filaments was imaged by an optical microscopy (EVOS, XL Core, Thermo Fisher Scientific, Waltham, MA). To investigate the effects of step distance on sheet thickness and roughness, a 27 gauge (200 µm inner diameter and 12.7 mm length) dispensing tip was used to print PDMS sheets (40.0 mm×4.0 mm) using PDMS ink mixed with the red color dye in the 6.0% (w/v) fumed silica bath. The step distance increased from 100 µm to 225 µm with each interval of 25 µm, the printing pressure was $1.03 \times 10^5$ Pa (15 psi), and the path speed was 1.0 mm/s. After printing, the PDMS sheets were kept in the fumed silica bath for 24 hours at room temperature for solidification and then removed from the bath for measurement. The surface and cross-section of the PDMS sheets were imaged by the optical microscopy.

SU-8 gear testing. Functional testing of printed SU-8 gear was performed using a home-made gear testing setup, which was composed of a mini electric motor (DC 1.5-6V, 15000-16500 rpm), a supplementary gear, and an adjustable DC power supply (Model 1601, Maxtec, Chicago, IL). The voltage of the power supply was increased from 0 V to 6 V in 15 seconds and then decreased to 0 V in 15 seconds to finish a testing circle.

Resistance measurement and conductivity/electromagnetic property testing. Both casting and 3D printing were used to fabricate samples for resistance measurement. The home-made PDMS mold was used to cast the conductive samples with the dimensions of 20.0 mm×7.5 mm×1.2 mm. After filling the mold with epoxy-based conductive ink, the mold was submerged in a fumed silica bath for 10 days at room temperature to make the casting samples. The printed samples were fabricated per the aforementioned protocol with the same designed dimensions. The resistance was measured using a resistance meter (RM3544, Hioki, Nagano, Japan). Functional testing of the 3D printed conductive inductor was performed by series connecting the inductor with an adjustable DC power supply (Model 1601, Maxtec, Chicago, IL), several resistors and/or a LED light. By adjusting the voltage of the power supply, the brightness of the LED light or the magnetic field strength can be changed Statistical analysis. All quantitative values of measurements in the figures were reported as means±standard deviation (SD) with n=3 samples per group. Statistical analysis was performed using analysis of variance (ANOVA) and p-values of less than 0.05 were considered statistically significant.

Conclusions. Disclosed herein are various embodiments of a method for 3D printing finished articles using hydrophobic build materials that enables freeform fabrication of hydrophobic structures without the use of printed support structures. In some embodiments, the build material can be directly printed in and supported by a yield-stress support bath to form filaments, layers, and eventually an entire 3D part in the support bath material. In some embodiments, the printed part may be still liquid or only partially solidified during and after printing. According to some embodiments, after printing, the support bath container is heated and/or irradiated with UV radiation to cause cross-linking of the hydrophobic build material, forming the finished article, and the solid printed part is then removed from the support bath. Provided herein are fumed silica-containing support bath materials that enable facile 3D fabrication of a range of hydrophobic build materials without the need for printing support structures to support the printed article during and after printing. Printing performance can be adjusted by varying the ink and support bath formulations to achieve desired resolution, printing speed, and article quality. Post-printing treatment for cross-linking of the hydrophobic build material can be an essentially hands-off procedure for this approach. The advantages of the disclosed methods and apparatuses and materials of manufacture, some of which are outlined throughout this disclosure, provide a compelling and effective solution to many of the problems in the 3D printing industry, some of which are outlined earlier in the disclosure.

In some embodiments, one or more of the operations, steps, or processes described herein may be modified or further amplified as described below. Moreover, in some embodiments, additional optional operations may also be included. It should be appreciated that each of the modifications, optional additions, and/or amplifications described herein may be included with the operations previously described herein, either alone or in combination, with any others from among the features described herein.

Although specific advantages have been enumerated above, various embodiments may include some, none, or all of the enumerated advantages.

Other technical advantages may become readily apparent to one of ordinary skill in the art after review of the following figures and description.

It should be understood that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

The provided method description, illustrations, and process flow diagrams are provided merely as illustrative examples and are not intended to require or imply that the steps of the various embodiments must each or all be performed and/or should be performed in the order presented or described. As will be appreciated by one of skill in the art, the order of steps in some or all of the embodiments described may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular. Further, any reference to dispensing, disposing, depositing, dispersing, conveying, injecting, conveying, inserting, communicating, and other such terms of art are not to be construed as limiting the element to any particular means or method or apparatus or system, and is taken to mean conveying the material within the receiving vessel, solution, conduit, or the like by way of any suitable method.

Unless otherwise indicated, all numbers expressing quantities of equipment, number of steps, material quantities, material masses, material volumes, operating conditions, and so forth used in the specification and claims are to be understood as being modified in all instances by the term "about". Accordingly, unless indicated to the contrary, the numerical parameters set forth in the present specification and attached claims are approximations that can vary depending upon the desired properties sought to be obtained by the present application. Generally, the term "about," as used herein when referring to a measurable value such as an amount of weight, time, volume, ratio, temperature, etc., is meant to encompass±10% of the stated value. For example, a value of "1,000," which would be construed from above as meaning "about 1,000," indicates a range of values from 900 to 1,100, inclusive of all values and ranges therebetween. As another example, a value of "about 1,000" should be taken to indicate any single value or sub-range of values from 900 to 1,100, inclusive of the values 900 and/or 1,100. As such, if a value of "about 1,000" is disclosed or claimed, this disclosure or claim element includes, for example, the value of 900, the value of 900.0000000000001, the value of 900.1, the value of 901, . . . the value of 1,000, . . . the value of 1,099.9999999, the value of 1,100, and all values, ranges, sub-ranges, therebetween including values interstitial to adjacent integers or whole numbers, to any decimal place.

Generally, the term "substantially," as used herein when referring to a measurable value, is meant to encompass±10% of the stated value. Generally, the term "substantially," as used herein with regard to a discrete position or orientation of a piece of equipment, component, or subcomponent, is meant to encompass the discrete position±10% of the discrete position. Generally, the term "substantially," as used herein with regard to a location of a piece of equipment, component, or subcomponent along a total range of travel of that equipment, component, or subcomponent, is meant to encompass±10% of the location of the equipment, component, or subcomponent with regard to the total range of travel of that piece of equipment, component, or subcomponent, including translational travel, rotational travel, and extending travel in any direction, orientation, or configuration. As such, the use of the phrase "substantially disposed within a container" would be construed from above as meaning that greater than or equal to 90% of the subject element is disposed within the container. Likewise, the use of the phrase "substantially positioned within a bath" would be construed from above as meaning that greater than or equal to 90% of the subject element is positioned within the bath.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Conventional terms in the fields of additive manufacturing, materials science, and chemistry have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation. Specific equipment and materials described in the examples are for illustration only and not for purposes of limitation. For instance, any and all articles, portions of articles, structures, bulk materials, and/or the like, having any form factor, scale, dimensions, aesthetic attributes, material properties, internal structures, and/or mechanical properties, which are formed according to any of the disclosed methods, approaches, processes, or variations thereof, using any devices, equipment, apparatuses, systems, or variations thereof, using any of the build material, printing mixture, ink, yield-stress support material, or other material compositions described herein or variations thereof, are all contemplated and covered by the present disclosure. None of the examples provided are intended to, nor should they, limit in any way the scope of the present disclosure.

Every document cited or referenced herein or cited or referenced in the priority document, including any cross referenced or related patent or application is hereby incorporated herein by reference in its entirety unless expressly excluded or otherwise limited. The citation of any document and/or the mention of methods or apparatuses as being conventional, typical, usual, or the like is not, and should not be taken as an acknowledgement or any form of suggestion that the reference or mentioned method/apparatus is prior art with respect to any invention disclosed or claimed herein or that it alone, or in any combination with any other reference or references, teaches, suggests or discloses any such invention or forms part of the common general knowledge in any country in the world. Further, to the extent that any meaning or definition of a term in this document conflicts with any meaning or definition of the same term in a document incorporated by reference, the meaning or definition assigned to that term in this document shall govern.

The various portions of the present disclosure, such as the Background, Summary, Brief Description of the Drawings, and Abstract sections, are provided to comply with requirements of the MPEP and are not to be considered an admission of prior art or a suggestion that any portion or part of the disclosure constitutes common general knowledge in any country in the world.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. A method for three-dimensional (3D) printing of a printed article, the method comprising:
   preparing a hydrophobic yield-stress support bath comprising a hydrophobic yield-stress support bath material, wherein the hydrophobic yield-stress support bath material comprises a mass of hydrophobic fumed silica nanoparticles dispersed in a volume of mineral oil;
   defining a predetermined path through the hydrophobic yield-stress support bath material, the predetermined path indicative of a volume and a form factor of the printed article;
   dispensing a hydrophobic printing material along the predetermined path through the hydrophobic yield-stress support bath material to 3D print an intermediate article; and
   causing at least partial solidification of the hydrophobic printing material within the hydrophobic yield-stress support bath material to form the printed article.

2. The method of claim 1, further comprising:
   causing cross-linking of the hydrophobic printing material by thermal curing of the intermediate article.

3. The method of claim 1, further comprising:
   causing cross-linking of the hydrophobic printing material by ultraviolet curing of the intermediate article.

4. The method of claim 1, wherein the hydrophobic printing material comprises a cross-linking material.

5. The method of claim 4, wherein the cross-linking material is at least one of: polydimethylsiloxane, SU-8 resin, or an epoxy-based conductive material.

6. The method of claim 1, wherein the hydrophobic fumed silica nanoparticles have an average diameter of between about 5 nm and about 50 nm.

7. The method of claim 1, wherein a concentration of the hydrophobic fumed silica nanoparticles in the mineral oil is between about 4% (w/v) and about 8% (w/v).

8. The method of claim 1, wherein the hydrophobic yield-stress support bath material is formed by:
   mixing the hydrophobic fumed silica nanoparticles and the mineral oil to form a hydrophobic fumed silica-mineral oil mixture;
   allowing the hydrophobic fumed silica-mineral oil mixture to age for greater than a day to form a stable colloidal suspension; and
   centrifuging the stable colloidal suspension to substantially remove any entrapped bubbles and form a hydrophobic yield-stress support bath material.

9. The method of claim 8, wherein the dispensing comprises moving a printing nozzle along the predetermined path through the hydrophobic yield-stress support bath material while dispensing the hydrophobic printing material.

10. The method of claim 1, wherein, before movement of a printing nozzle through a portion of the hydrophobic yield-stress support bath material, the hydrophobic fumed silica nanoparticles in the portion of the hydrophobic yield-stress support bath material form fumed silica aggregates, causing the hydrophobic yield-stress support bath material to behave in a solid-like manner.

11. The method of claim 10, wherein, during the movement of the printing nozzle through the portion of the hydrophobic yield-stress support bath material, external shear stress is applied by the printing nozzle to the portion of the hydrophobic yield-stress support bath material such that the fumed silica aggregates in the portion of the hydrophobic yield-stress support bath material are caused to disperse into the mineral oil, causing localized shear thinning of the hydrophobic yield-stress support bath material, allowing printing a volume of the hydrophobic printing ink into the portion of the hydrophobic yield-stress support bath material.

12. The method of claim 11, wherein, after the movement of the printing nozzle through the portion of the hydrophobic yield-stress support bath material, the hydrophobic fumed silica nanoparticles dispersed within the portion of the hydrophobic yield-stress support bath material reaggregate to form fumed silica reaggregates, causing the portion of the hydrophobic yield-stress support bath material to behave again in the solid-like manner, such that the portion of the hydrophobic yield-stress support bath material is rheologically capable of retaining the volume of the hydrophobic printing ink within the portion of the hydrophobic yield-stress support bath material.

13. The apparatus of claim 10, wherein the fumed silica aggregates have an average aggregate size of between about 100 nm and about 500 nm.

14. The method of claim 12, wherein, after printing of the printed article, the hydrophobic yield-stress support bath material experiences negligible structural change at temperatures from about 25 degrees Celsius to about 100 degrees Celsius.

15. A method for three-dimensional (3D) printing of a printed article, the method comprising:
   preparing a hydrophobic yield-stress support bath comprising a mass of hydrophobic fumed silica nanoparticles dispersed in a volume of mineral oil;
   determining, using a computing device, a path of travel for a printing nozzle through the hydrophobic yield-stress support bath and corresponding printing rates based on a desired volume and a desired form factor of the printed article;
   causing, using the computing device, the printing nozzle to move along the path of travel through the hydrophobic yield-stress support bath while printing a hydrophobic printing ink into the hydrophobic yield-stress support bath at a plurality of locations along the path of travel to form an intermediate article; and causing at least partial solidification of the intermediate article within the hydrophobic yield-stress support bath to form the printed article.

16. An apparatus for three-dimensional (3D) printing of a printed article, the apparatus comprising:
a hydrophobic yield-stress support bath comprising a hydrophobic yield-stress support bath material, wherein the hydrophobic yield-stress support bath material comprises a stable colloidal suspension of hydrophobic fumed silica nanoparticles in mineral oil;
a reservoir configured to retain a hydrophobic printing ink;
a printing nozzle in fluidic communication with the reservoir and configured to receive portions of the hydrophobic printing ink from the reservoir and dispense the portions of the hydrophobic printing ink into the hydrophobic yield-stress support bath; and
a computing device configured to cause the printing nozzle to move along a predetermined path through the hydrophobic yield-stress support bath while the printing nozzle dispenses the portions of the hydrophobic printing ink into the hydrophobic yield-stress support bath.

17. The apparatus of claim 16, wherein the computing device is configured to determine the predetermined path through the hydrophobic yield-stress support bath and a volume of corresponding portions of the hydrophobic printing ink at locations along the predetermined path based on a desired form factor of an intermediate article.

18. The apparatus of claim 16, wherein the computing device is configured to receive instructions regarding the predetermined path through the hydrophobic yield-stress support bath and the volume of corresponding portions of the hydrophobic printing ink at the locations along the predetermined path, the predetermined path and the volume of corresponding portions of the hydrophobic printing ink being associated with the desired form factor of the intermediate article.

19. The apparatus of claim 16, wherein the hydrophobic printing material comprises a cross-linkable material.

20. The apparatus of claim 19, further comprising:
a thermal curing device configured to thermally cure an intermediate article, causing cross-linking of the hydrophobic printing material to form the printed article.

21. The apparatus of claim 19, further comprising:
an ultraviolet curing device configured to cure an intermediate article, causing cross-linking of the hydrophobic printing material to form the printed article.

22. The apparatus of claim 19, wherein the cross-linking material is at least one of: polydimethylsiloxane, SU-8 resin, or an epoxy-based conductive material.

23. The apparatus of claim 16, wherein the hydrophobic fumed silica nanoparticles have an average diameter of between about 5 nm and about 50 nm.

24. The apparatus of claim 16, wherein a concentration of the hydrophobic fumed silica nanoparticles in the mineral oil is between about 4% (w/v) and about 8% (w/v).

25. The apparatus of claim 16, wherein the hydrophobic yield-stress support bath material is formed by:
mixing the hydrophobic fumed silica nanoparticles and the mineral oil to form a hydrophobic fumed silica-mineral oil mixture;
allowing the hydrophobic fumed silica-mineral oil mixture to age for greater than a day to form the stable colloidal suspension; and
centrifuging the stable colloidal suspension to substantially remove any entrapped bubbles and form a hydrophobic yield-stress support bath material.

26. The apparatus of claim 25, wherein the printing nozzle is configured to dispense the hydrophobic printing material along the predetermined path through the hydrophobic yield-stress support bath to 3D print an intermediate article by moving along the predetermined path through the hydrophobic yield-stress support bath material while dispensing the hydrophobic printing material.

27. The apparatus of claim 16, wherein, before movement of the printing nozzle through a portion of the hydrophobic yield-stress support bath material, the hydrophobic fumed silica nanoparticles in the portion of the hydrophobic yield-stress support bath material form fumed silica aggregates, causing the hydrophobic yield-stress support bath material to behave in a solid-like manner.

28. The apparatus of claim 27, wherein, during the movement of the printing nozzle through the portion of the hydrophobic yield-stress support bath material, external shear stress is applied by the printing nozzle to the portion of the hydrophobic yield-stress support bath material such that the fumed silica aggregates in the portion of the hydrophobic yield-stress support bath material are caused to disperse into the mineral oil, causing localized shear thinning of the hydrophobic yield-stress support bath material, allowing printing a volume of the hydrophobic printing ink into the portion of the hydrophobic yield-stress support bath material.

29. The apparatus of claim 28, wherein, after the movement of the printing nozzle through the portion of the hydrophobic yield-stress support bath material, the hydrophobic fumed silica nanoparticles dispersed within the portion of the hydrophobic yield-stress support bath material reaggregate to form fumed silica reaggregates, causing the portion of the hydrophobic yield-stress support bath material to behave again in the solid-like manner, such that the portion of the hydrophobic yield-stress support bath material is rheologically capable of retaining the volume of the hydrophobic printing ink within the portion of the hydrophobic yield-stress support bath material.

30. The apparatus of claim 27, wherein the fumed silica aggregates have an average aggregate size of between about 100 nm and about 500 nm.

31. The apparatus of claim 29, wherein, after printing of the printed article, the hydrophobic yield-stress support bath material experiences negligible structural change at temperatures from about 25 degrees Celsius to about 100 degrees Celsius.

* * * * *

UNITED STATES PATENT AND TRADEMARK OFFICE
CERTIFICATE OF CORRECTION

| | |
|---|---|
| PATENT NO. | : 12,017,414 B2 |
| APPLICATION NO. | : 17/870424 |
| DATED | : June 25, 2024 |
| INVENTOR(S) | : Yong Huang et al. |

It is certified that error appears in the above-identified patent and that said Letters Patent is hereby corrected as shown below:

In the Claims

Column 26, Line 44, Claim 13, delete "apparatus" and insert -- method --, therefor.

Signed and Sealed this
Eighth Day of October, 2024

Katherine Kelly Vidal
*Director of the United States Patent and Trademark Office*